(12) United States Patent
Reyes et al.

(10) Patent No.: US 11,334,582 B1
(45) Date of Patent: May 17, 2022

(54) MOBILE EXPLORER

(71) Applicant: MicroStrategy Incorporated, Vienna, VA (US)

(72) Inventors: Benjamin Reyes, Great Falls, VA (US); Hugh Owen, Arlington, VA (US); Jose Nocedal de la Garza, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 387 days.

(21) Appl. No.: 16/284,589

(22) Filed: Feb. 25, 2019

Related U.S. Application Data

(63) Continuation of application No. 14/793,276, filed on Jul. 7, 2015, now Pat. No. 10,216,809.

(60) Provisional application No. 62/021,518, filed on Jul. 7, 2014.

(51) Int. Cl.
| | |
|---|---|
| *G06F 16/00* | (2019.01) |
| *G06F 16/248* | (2019.01) |
| *G06F 3/0484* | (2022.01) |
| *G06F 3/04883* | (2022.01) |
| *G06F 16/242* | (2019.01) |

(52) U.S. Cl.
CPC .......... *G06F 16/248* (2019.01); *G06F 3/0484* (2013.01); *G06F 3/04883* (2013.01); *G06F 16/2428* (2019.01)

(58) Field of Classification Search
CPC ............... G06F 16/248; G06F 3/04883; G06F 16/2428; G06F 3/0484

USPC ........................................................ 707/765
See application file for complete search history.

(56) References Cited

U.S. PATENT DOCUMENTS

| | | | |
|---|---|---|---|
| 8,019,749 B2* | 9/2011 | Leban | G06F 16/9038 707/713 |
| 8,489,065 B2 | 7/2013 | Green et al. | |
| 8,677,285 B2 | 3/2014 | Tsem et al. | |
| 8,793,610 B2 | 7/2014 | Parker | |
| 8,799,777 B1 | 8/2014 | Lee et al. | |
| 8,850,362 B1* | 9/2014 | Khoshnevisan | G06F 16/9027 715/853 |
| 8,884,893 B2 | 11/2014 | Kim et al. | |
| 9,055,904 B2 | 6/2015 | Yoo et al. | |
| 9,058,104 B2 | 6/2015 | St. Clair | |
| 9,298,360 B2 | 3/2016 | Fleizach et al. | |
| 9,508,002 B2 | 11/2016 | Barcay | |
| 9,569,078 B2 | 2/2017 | Cherna et al. | |
| D793,411 S | 8/2017 | Chaudhri et al. | |
| D809,548 S | 2/2018 | Anzures et al. | |
| 10,216,809 B1 | 2/2019 | Reyes et al. | |
| 2003/0164844 A1* | 9/2003 | Kravitz | G11B 27/105 715/700 |
| 2004/0119759 A1 | 6/2004 | Barros | |
| 2004/0268393 A1 | 12/2004 | Hunleth et al. | |
| 2007/0011146 A1* | 1/2007 | Holbrook | G06F 16/958 |
| 2007/0055782 A1 | 3/2007 | Wright et al. | |
| 2008/0174570 A1 | 7/2008 | Jobs et al. | |
| 2009/0327936 A1* | 12/2009 | Wong | G06F 3/0483 715/764 |

(Continued)

*Primary Examiner* — Thanh-Ha Dang
(74) *Attorney, Agent, or Firm* — Fish & Richardson P.C.

(57) ABSTRACT

A system extracts data from one or more sources of data and displays information regarding the data using interactive visualizations that allow a user to interact directly with the visualizations of the data, without necessarily requiring the user to utilize a menu-driven interface.

19 Claims, 34 Drawing Sheets

(56) References Cited

U.S. PATENT DOCUMENTS

| | | |
|---|---|---|
| 2011/0196864 A1 | 8/2011 | Mason et al. |
| 2011/0283242 A1 | 11/2011 | Chew et al. |
| 2012/0047045 A1* | 2/2012 | Gopikrishna .......... G06Q 10/10 705/26.5 |
| 2012/0278752 A1 | 11/2012 | Parker |
| 2013/0007061 A1 | 1/2013 | Luomala et al. |
| 2013/0041778 A1* | 2/2013 | Nativ ..................... G06Q 30/08 705/26.62 |
| 2013/0073473 A1* | 3/2013 | Heath ..................... G06Q 30/06 705/319 |
| 2013/0138638 A1 | 5/2013 | Karenos et al. |
| 2013/0263048 A1* | 10/2013 | Shimizu ........... H04N 21/42204 715/802 |
| 2014/0043325 A1 | 2/2014 | Ruble et al. |
| 2014/0282099 A1* | 9/2014 | Bronder .................. G06F 16/54 715/753 |
| 2014/0359505 A1 | 12/2014 | Cisler et al. |
| 2014/0359558 A1* | 12/2014 | Chamberlain ............ G06F 8/35 717/105 |
| 2015/0058337 A1 | 2/2015 | Gordon et al. |
| 2015/0067556 A1 | 3/2015 | Tibrewal et al. |
| 2015/0161212 A1 | 6/2015 | Yang et al. |
| 2015/0178972 A1 | 6/2015 | Barcay et al. |
| 2020/0177552 A1* | 6/2020 | Morris ................ H04L 63/0263 |

* cited by examiner example of filtering

① 2 ELEMENTS COMPARISON

DRAG NOW DIMENSIONS INTO TEMPLATE TO ADD TO COMPARISON

TAP ON A DIMENSION TO CHANGE TO A NEW ATTRIBUTE

TAP ON THE SECOND ATTRIBUTE TO DESELECT

METRICS - BAR CHART

TOP ON METRIC 2 TO CHANGE METRIC

DRAG METRIC 1 INTO THE TEMPLATE

DRAG METRIC 2 TO ADD TO METRIC COMPARISIONS

COMPARE TWO METRICS

TAP ON ANOTHER ARTICLE TO CHANGE ATTRIBUTE

MOBILE EXPLORER

CROSS-REFERENCE TO RELATED APPLICATIONS

This application is a continuation of U.S. application Ser. No. 14/793,276, filed Jul. 7, 2015, now allowed, which claims the benefit of U.S. Provisional Application No. 62/021,518, filed Jul. 7, 2014, and titled "Mobile Explorer." Both of these prior applications are incorporated by reference in their entirety.

TECHNICAL FIELD

This disclosure relates to extracting and processing data and facilitating data discovery and data visualization.

BACKGROUND

Computer systems may store data about or otherwise related to people, businesses, and places, and such data may be accessed by users for various purposes.

SUMMARY

Techniques are described for extracting data from one or more sources of data and displaying information about the data using interactive visualizations that allow a user to interact directly with the visualizations of the data, without necessarily requiring the user to utilize a menu-driven interface.

In one aspect, a method is executed on one or more computers. The method includes receiving a first query and obtaining, based on the first query, first data. The method also includes displaying, on a touch-screen display of the one or more computers, a graphical representation of the first data in which numerical values of the first data are represented by sizes and positions of one or more geometric objects. A user's touch input is received, via the touch-screen display, indicating a gesture in a particular region of the graphical representation displayed on the touch-screen display. Based on the gesture indicated by the user's touch input in the particular region of graphical representation of the first data, a second query is determined to be executed regarding the first data. Based on the second query associated with the gesture indicated by the user's touch input, second data is obtained. An update of the graphical representation is displayed, on the touch-screen display of the one or more computers, in which the second data is represented by changes in the sizes or positions of the one or more geometric objects.

In some implementations, the graphical representation is a visualization of data stored in a database system.

In some implementations, the method also includes generating the visualization of the data as a control mechanism to perform operations on the data.

In some implementations, the graphical representation of the first data includes at least one of a temporal-based visualization, geographic-based visualization, or three-dimensional-based visualization.

In some implementations, the update of the graphical representation of the first data includes at least one of a splitting of a geometric object into a plurality of smaller geometric objects, or a merging of two or more geometric objects into a larger geometric object, or a three-dimensional rotation of the graphical representation.

In some implementations, the gesture indicated by the user's touch input includes at least one of a tap, a swipe, a drag-and-drop, or a pinch.

In some implementations, the second query represents a request for more details regarding a portion of the first data associated with the particular region of the graphical representation in which the user's input touch was received.

In some implementations, the graphical representation of the first data includes two or more visual layers representing different attributes of the first data.

In some implementations, the different attributes of the first data include at least one of a geographic attribute or a temporal attribute.

In some implementations, the method also includes displaying, in response to the user's touch input, a preview of the second query, the preview representing a simplified version of the graphical representation of the second data.

In some implementations, the method also includes generating the preview of the second query based on metadata associated with the second data.

In some implementations, the second query includes a request for a filtering operation based on at least one of an attribute of the second data or a criterion specified by a user.

In some implementations, the attribute of the second data includes at least one of a geographic attribute or a temporal attribute, and the criterion specified by the user includes at least one of an aggregate value metric, an average value metric, or a maximum value metric.

In some implementations, at least one of obtaining the first data or obtaining the second data includes connecting to one or more remote data stores over a communication network.

In some implementations, the method also includes accessing a user profile that includes one or more templates for graphical representations of data, and generating the graphical representation of the first data based on at least one of the one or more templates in the user profile.

In some implementations, displaying the graphical representation of the first data includes: selecting a subset of the first data, and generating the graphical representation of the first data based on the selected subset of the first data.

In some implementations, the graphical representation includes a split visualization including a plurality of visualizations including a timeline-based visualization and a geographic-based visualization.

In some implementations, the second query includes a request to merge data between at least two visualizations among the plurality of visualizations.

In some implementations, the method also includes storing the obtained first data and the obtained second data in a local data store in the one or more computers.

In some implementations, the first data includes a plurality of datasets obtained from physically separate data stores.

In another aspect, a system includes a first device storing first instructions for execution by a first processor coupled to the first device, wherein the first instructions, when executed, are operable to cause the first processor to perform the operations described above.

In another aspect, a computer program product is implemented in a non-transitory computer-readable medium storing instructions executable by one or more processors that, upon execution, cause the one or more processors to perform the operations described above.

The details of one or more implementations are set forth in the accompanying drawings and the description, below. Other features will be apparent from the description and drawings, and from the claims.

DETAILED DESCRIPTION

Figure 1:
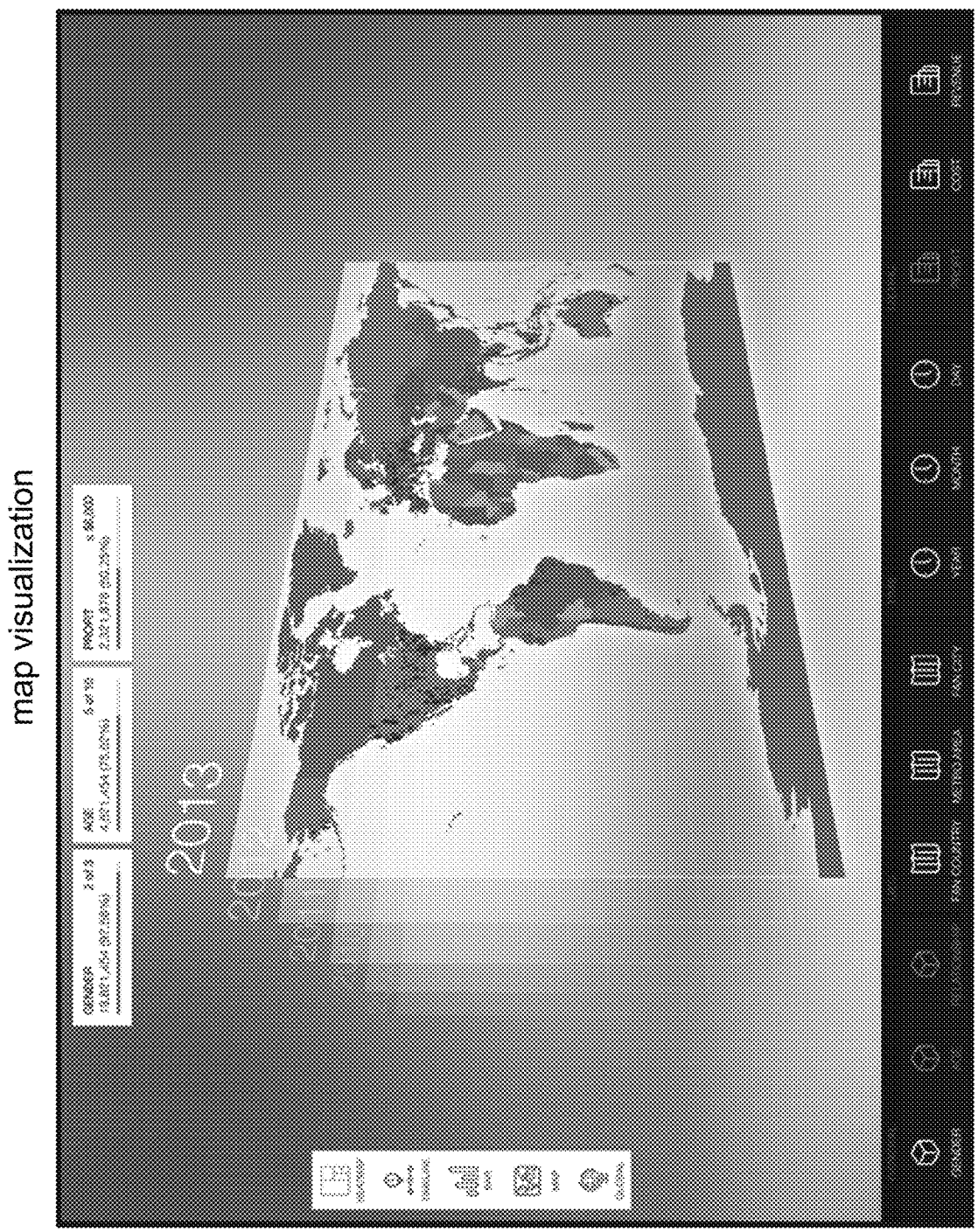
FIGS. 1-12 are diagrams illustrating example user interfaces that may be displayed to a user of a mobile-based data visualization application.

A system presents information to a user of an application about data that is of interest to the user in a manner that allows the user to interact with visualizations of the data. The presented information may be provided in such a way that the particular user of the application can directly interact with visualizations of the data, without necessarily being required to interact with a menu-driven interface to control the visualizations. In some implementations, the visualizations provided by the application may be touch-driven, such that a user may utilize touch-based or gesture-based controls to interact directly with the visualizations of the data. As such, the visualizations may themselves be the control mechanism for performing operations on the data, and the visualizations may provide various types of control inputs for manipulating the data. The application can be presented on any suitable computing device, such as a mobile device (e.g., a phone or a tablet), or a desktop computer, etc.

The presented information can be provided in such a way that the particular user of the application can more easily identify data that is likely to be of interest to the particular user and/or more easily identify characteristics or attributes within the data that is of interest to the particular user. For example, in some cases, the application may enable a user to synthesize, compare, filter, or perform other operations on the data by directly interacting with visualizations of the data. The application may present the visualizations in a hierarchical manner, such that different characteristics or attributes of the data are presented in different visual layers, allowing a user to more quickly and easily understand the presented data.

The application enables a user to interact directly with the visualizations of data, without necessarily requiring the user to operate a menu-driven interface. For example, the application may allow a user to directly manipulate the visualizations using touch-based or gesture-based controls (e.g., pinch or swipe). As such, the user is not necessarily required to use a menu-driven interface to select and interact with data, but rather is enabled to use the visualization of data itself as the selection and interaction mechanism. By using the visualizations of data as control inputs for manipulating the data, the application allows a user to more conveniently and intuitively explore the data. This facilitates a more convenient and user-friendly experience that allows a user to more easily and quickly comprehend and interact with the data that is displayed on the visualizations.

The application may present a variety of different visualizations of the data, examples of which include temporal-based visualizations, geographic-based visualizations, and/or three-dimensional visualizations. In some implementations, the visualizations may be combined with each other or with other types of graphical user-interface elements, such as a dashboard, that facilitates user selection and control of the visualizations.

The application presents various attributes (e.g., geographic attributes, temporal attributes, or other attributes) of the data in the visualizations. In some implementations, the attributes may be presented in a hierarchical manner, such as by overlaying attributes in different layers. In addition to attributes, the application may utilize metrics (e.g., economic metrics, or other metrics based on aggregate value, average value, maximum value, etc.) and allow the user to control how the data is synthesized and/or displayed. Attributes and/or metrics can be displayed and selected in any suitable combinations and variations.

The data on which the system operates is not limited to any particular type of data, nor is it limited to any particular type of data source. For example, the data may be related to people, businesses, products, geographic areas, etc. As an example, the data may be related to a social network and may include check-ins by friends on a geographic map. In some implementations, the data may be in the form of objects in one or more datasets. The application may manage multiple datasets and provide visualizations that correspond to different datasets. The application may also allow a user to perform touch-driven controls (e.g., drag and drop, gesture manipulations, etc.) to interact with and explore the data in the different datasets.

The data may be stored remotely on a server (e.g., in a cloud-based server) or may be stored on a computing device that is local to the user (e.g., the computing device running the application). For example, in some implementations, the application may extract data from a combination of different data sources, and present a user with an aggregate view of the data such that the user is not necessarily aware of the disparate sources of the data. In some implementations, the application may indicate the sources of data to the user, and/or allow the user to selectively control the source of the data that is displayed by the application.

Regardless of the exact nature and source of data, the data is displayed by the application using various types of interactive visualizations. For example, in response to a user indicating a query for data (e.g., pinch-and-zoom on an interactive map-based visualization), the application may provide another visualization for the results of the query. In some implementations, the application may provide overviews and previews of the user's query (e.g., based on abstracted metadata). For example, the application may provide a query preview that allows a user to rapidly understand the data through multidimensional analysis and metric summaries.

In some implementations, the data is selectable and displayable in hierarchies. As an example, there may be at least two hierarchies that organize the data according to various attributes (e.g., income, gender, age, etc.). The application may also enable a user to define and manage filters for the data. For example, a user may define a filter based on an attribute element or metric qualification. The application may enable a user to edit a filter definition and may also provide different views based on the filter, such as summary views and/or detail views.

The application may also enable a user to define a profile. The profile may allow the user to customize the data discovery and exploration process. Various properties may be customized and/or selected. For example, a user may customize properties such as views or visualizations of the data. In some implementations, the visualizations may be based on templates, which may be customized by a user. The application may also enable a user to select desired previews while browsing, utilize quick comparisons of data, and/or customize gesture-based shortcut commands to facilitate faster understanding and exploration of the data.

The application may also allow a user to customize the layouts in which visualizations of data are presented. For example, the application may enable a user to navigate between different layouts, name/rename layouts, and generally manage layouts.

The application manipulates and processes different data structures in a fast and efficient manner. The data may be obtained from a server and/or may be stored locally on the user's device. In some implementations, the application may utilize one or more techniques to compact the data according to the user's device. For example, the application may sample and prune the data, and limit the amount of data that is stored and/or displayed on the user's mobile device. In such implementations, the application enables efficient and intuitive data discovery on the user's mobile device.

The application utilizes, in some implementations, workflows. The workflows may be utilized to perform various operations on data, such as merging different datasets. As an example, the application may provide split visualizations (e.g., displaying the data on a timeline and a geographical map) and may allow a user to merge data back and forth between the different visualizations.

Other types of visualizations are possible. For example, the application may provide a three-dimensional visualization and allow a user to navigate around a three-dimensional representation of the data. In some implementations, the application may utilize texture, color, and/or movement to enhance the three-dimensional visualization. The user can utilize various selectors to switch between different visualizations. The visualizations may display a single dataset or a library of data that includes different datasets.

In some implementations, a visualization may be based on a template. The application may enable a user to perform various controls on the data by interacting with the visualizations, such as "zooming-in" on particular portions of the visualization (e.g., to obtain more detailed or otherwise related data regarding that portion), sort the data, apply thresholds to the data, compute subtotals on the data, apply and view filters to the data, and/or apply labels to the data.

The system may use any suitable structure or format of data, and may generally be compatible with various types of data. As an example, the system may utilize a row and column structure for the dataset and may store the data in JavaScript Object Notation (JSON) format.

In addition, or as an alternative, to providing visualizations for exploring and discovering data, the application may provide visualizations that enable various analyses of the data, such as correlations (e.g., relational analysis) or temporal analysis.

As an example, such an application may be used by people or companies seeking to understand and/or compare various characteristics of different geographic locations. For instance, a college graduate may seek to compare different cities in which he/she received a job offer, or a business may seek to target/expand to different geographic regions, or curious users may be interested in gaining insights about people in different places. In general, the application enables users to easily and intuitively explore data, some of which may be complex and extensive, to quickly select, visualize, and understand different attributes of people and places represented by that data. As other examples, cities or companies may use the application to better understand its residents or employees and decide what types of services to offer in different locations, or politicians may use the application to better understand their voter bases in different geographic regions.

FIGS. 1-12 are diagrams illustrating example user interfaces that may be displayed to a user of a mobile-based data exploration application.

Figure 2:
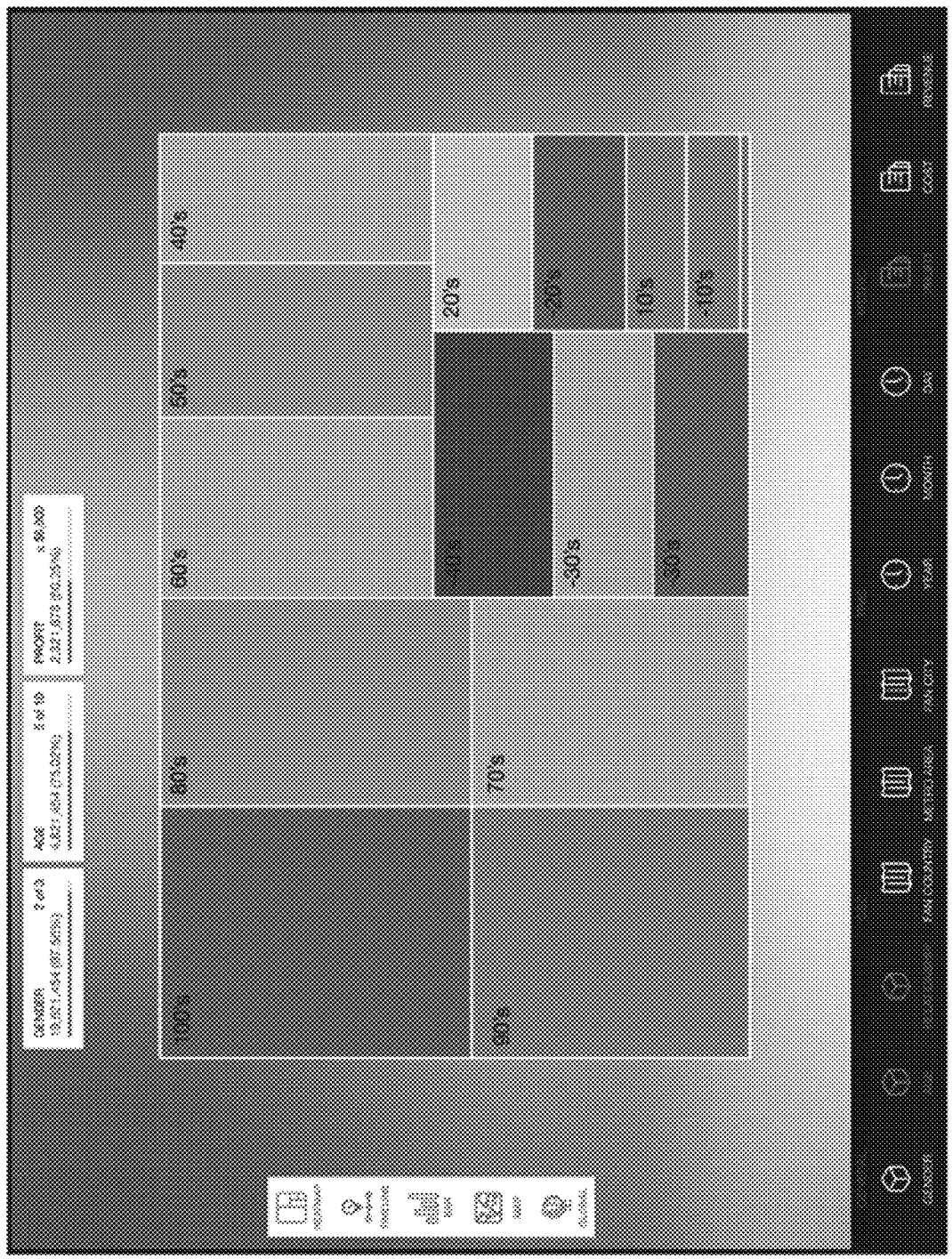
Figure 3:
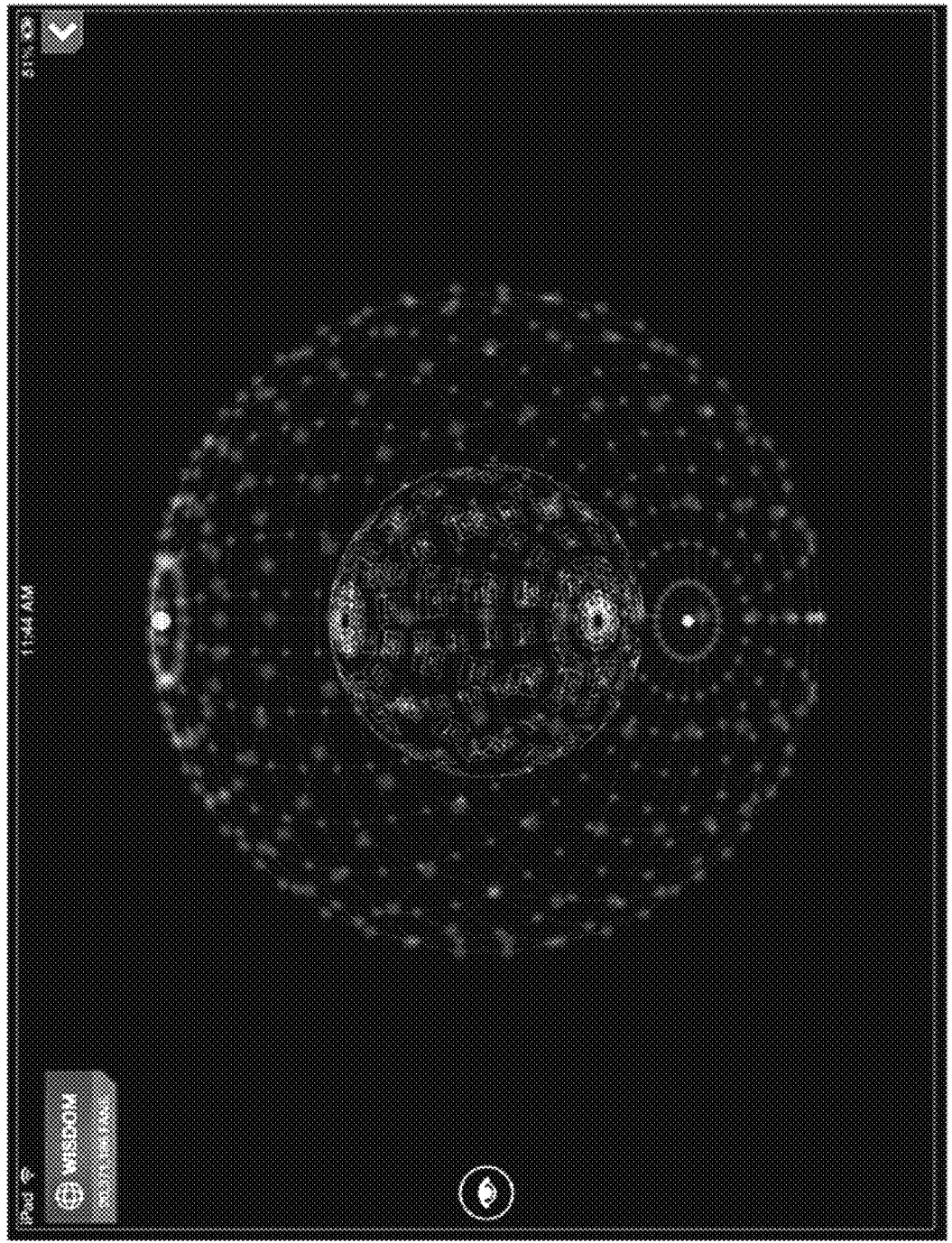

Referring to FIGS. 1-3, example user interfaces that display different visualizations are presented. For example, FIG. 1 illustrates a map-based visualization that includes different layers of data (e.g., for different years). The visualization of FIG. 1 includes a time dimension and a geographic dimension.

In some implementations, the system may enable a user to use a two-hand (or two-finger) gesture in which one input (hand/finger) controls the time attribute and the other input (hand/finger) controls the geographic attribute. For example, the system may enable a user to pinch a particular region in geographic space and scroll the timeline to view data for a particular date for the pinched region at the time to which the user scrolls. As another example, the system may enable a user to pinch (or draw a circle around) a particular region in geographic space and pinch a set of years in the timeline to perform a computation (e.g., an average, a maximum, etc.) for the pinched (or circled) region for the set of years pinched.

FIG. 2 illustrates a heatmap-based visualization, which uses different colors to indicate the numerical ranges of data (e.g., the color red to indicate a higher range of data, and green to indicate a lower range of data). As an example, in the context of a business, the system may display the visualization to show sales of five different items, A through E, in different colors to indicate different amounts of sales of those items. In some implementations, the system may enable the user to simultaneously control different attributes of the data using touch input directly on the visualization of the data. For example, the system may enable a user to select particular data (e.g., sales of item B) and then perform geographic manipulations and also time manipulations on the selected data (e.g., sales of item B).

FIG. 3 illustrates a three-dimensional visualization of data. In some implementations, the system may enable a user to directly manipulate the three-dimensional visualization by performing various gestures on the visualization, such as rotation, zooming, pinch, selection, etc. In some implementations, as described above, the system may enable the user to simultaneously control different attributes of data in the three-dimensional visualization using touch input directly on the three-dimensional visualization. Other types of visualizations are possible.

Figure 4:
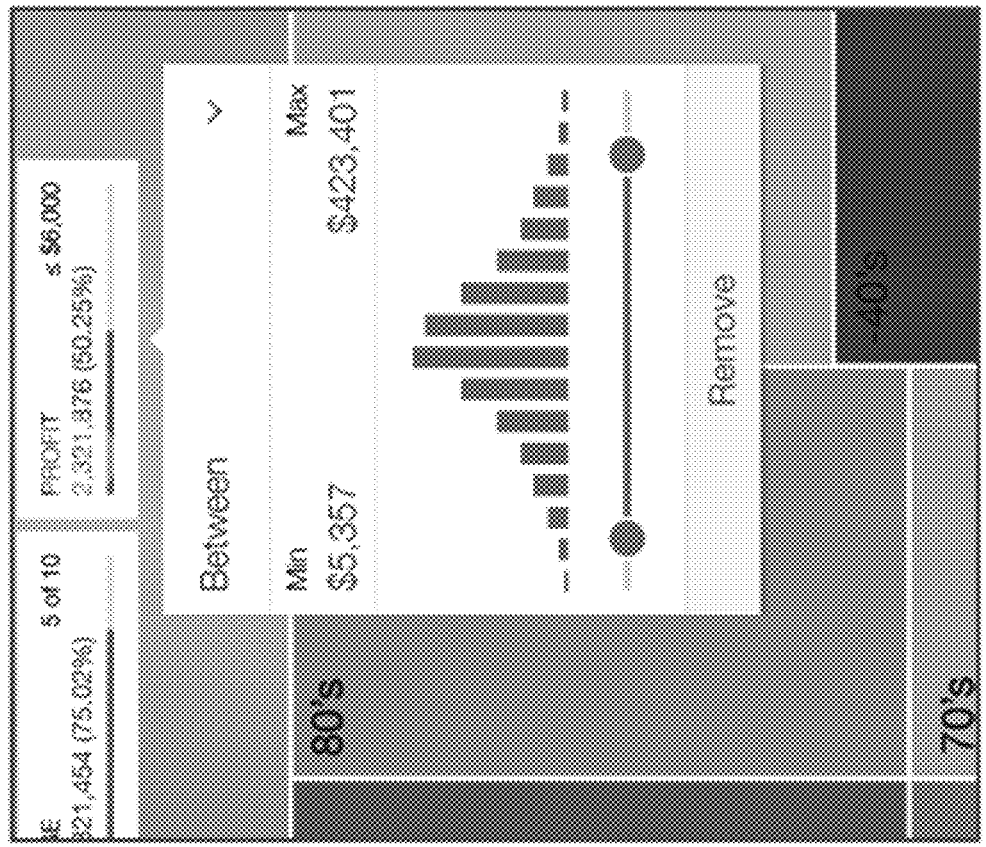
Figure 4:
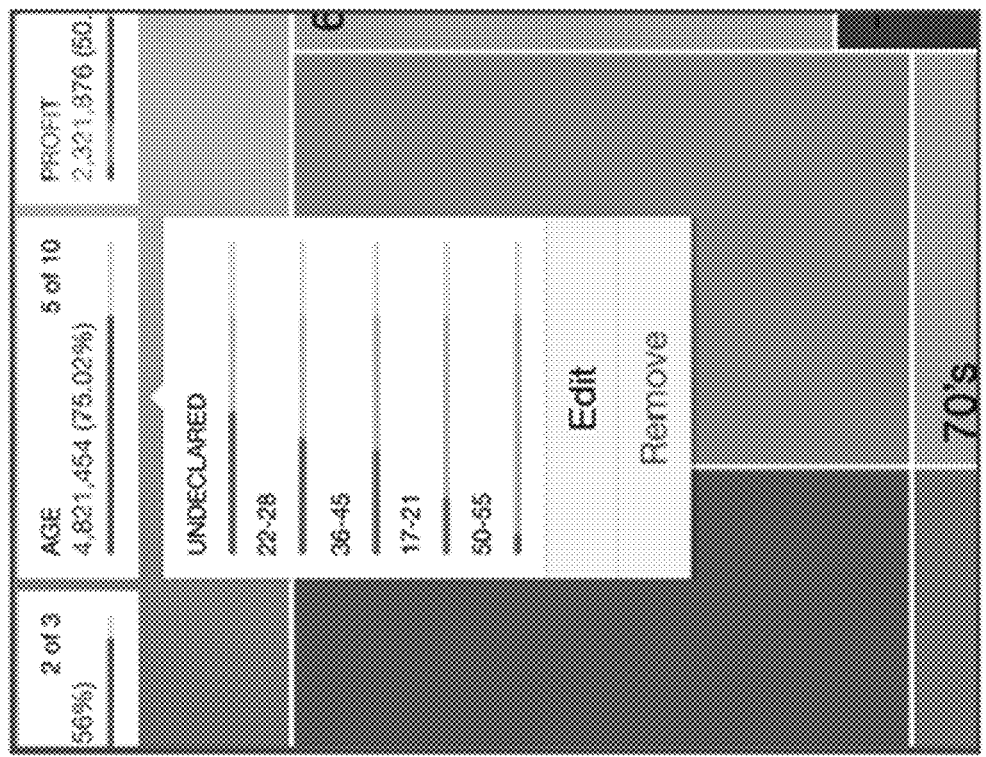
Figure 5:
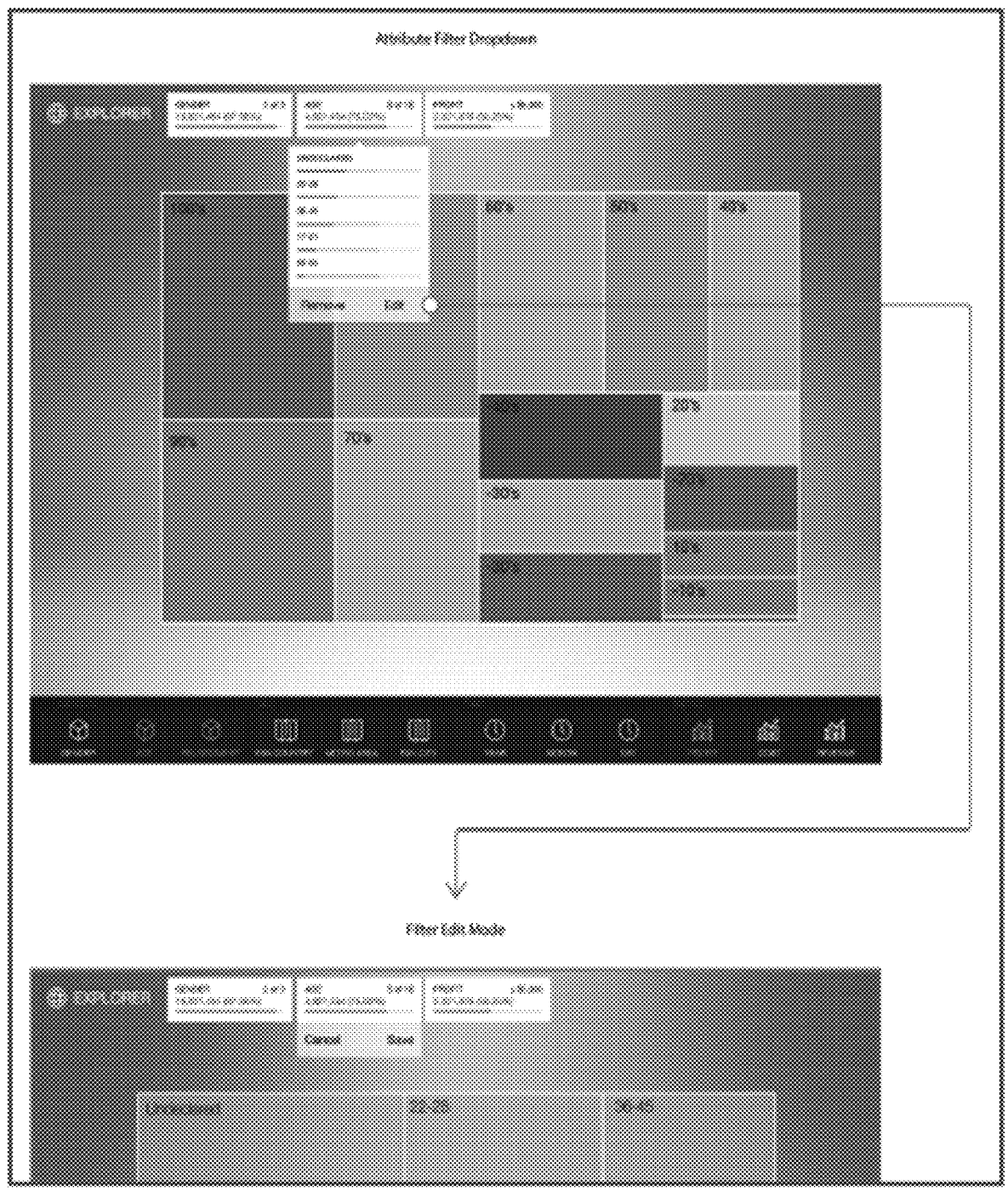

Referring now to FIGS. 4 and 5, example user interfaces of filtering operations are presented. For example, FIG. 4 illustrates an example user interface for selecting filter parameters, such as age and financial information. The definition of filtering parameters may also be specified by a user, as shown in FIG. 5, which illustrates an example user interface of a filter edit mode.

Figure 6:
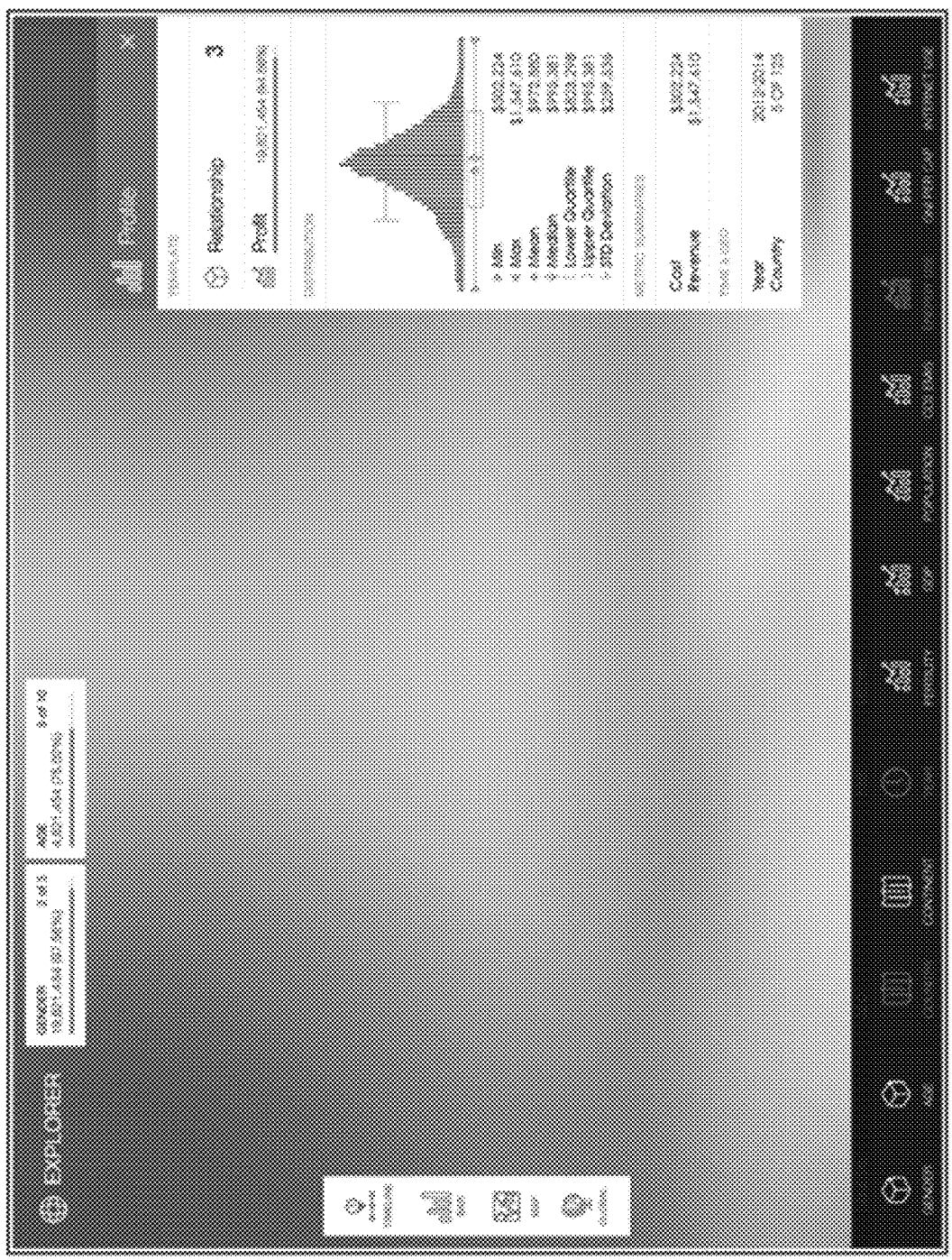
Figure 7:

Referring now to FIGS. 6 and 7, example user interfaces of profiling operations are presented. As examples, FIG. 6 illustrates a bar graph visualization of a profile and FIG. 7 illustrates a map-based visualization of a profile.

Figure 8:
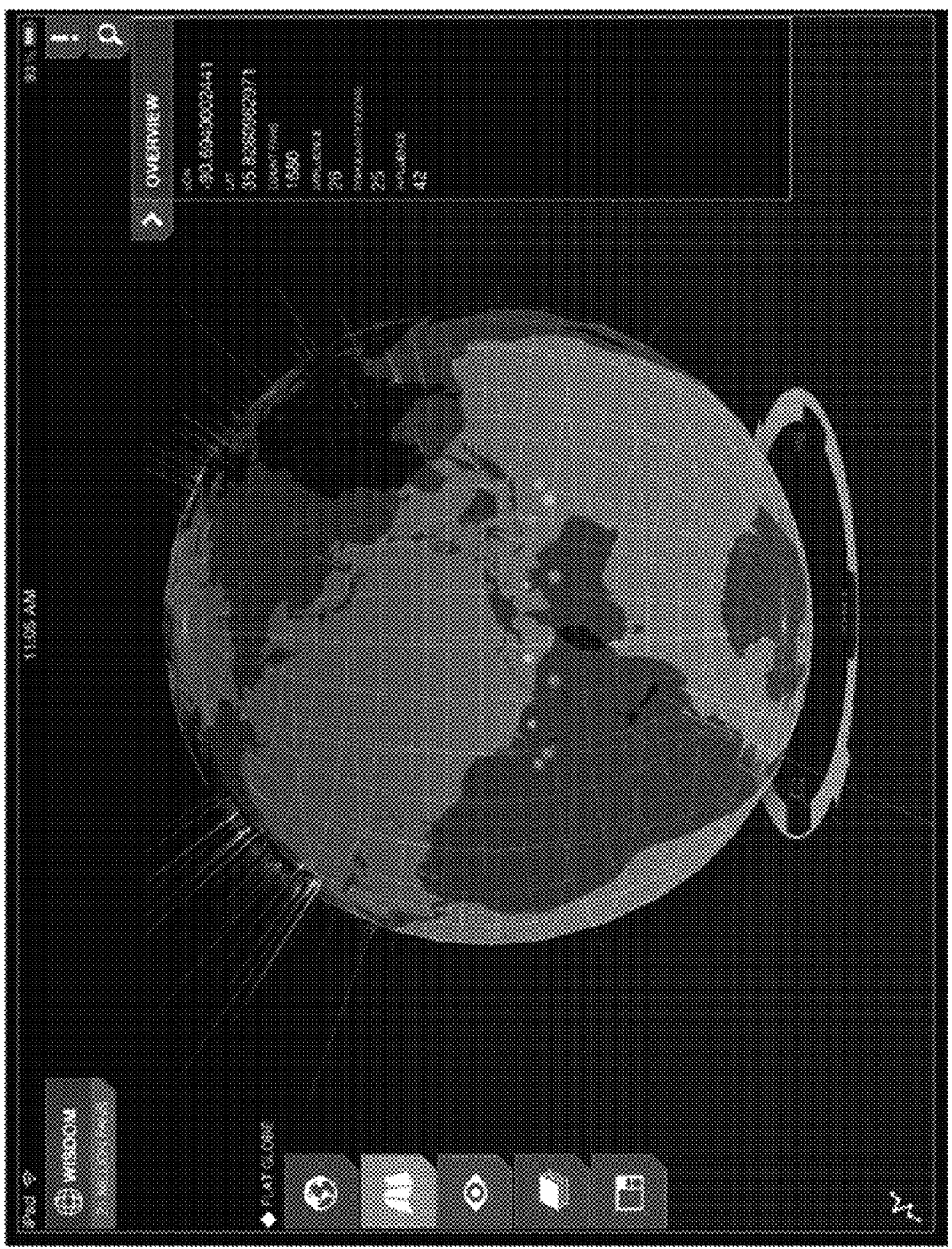
Figure 9:
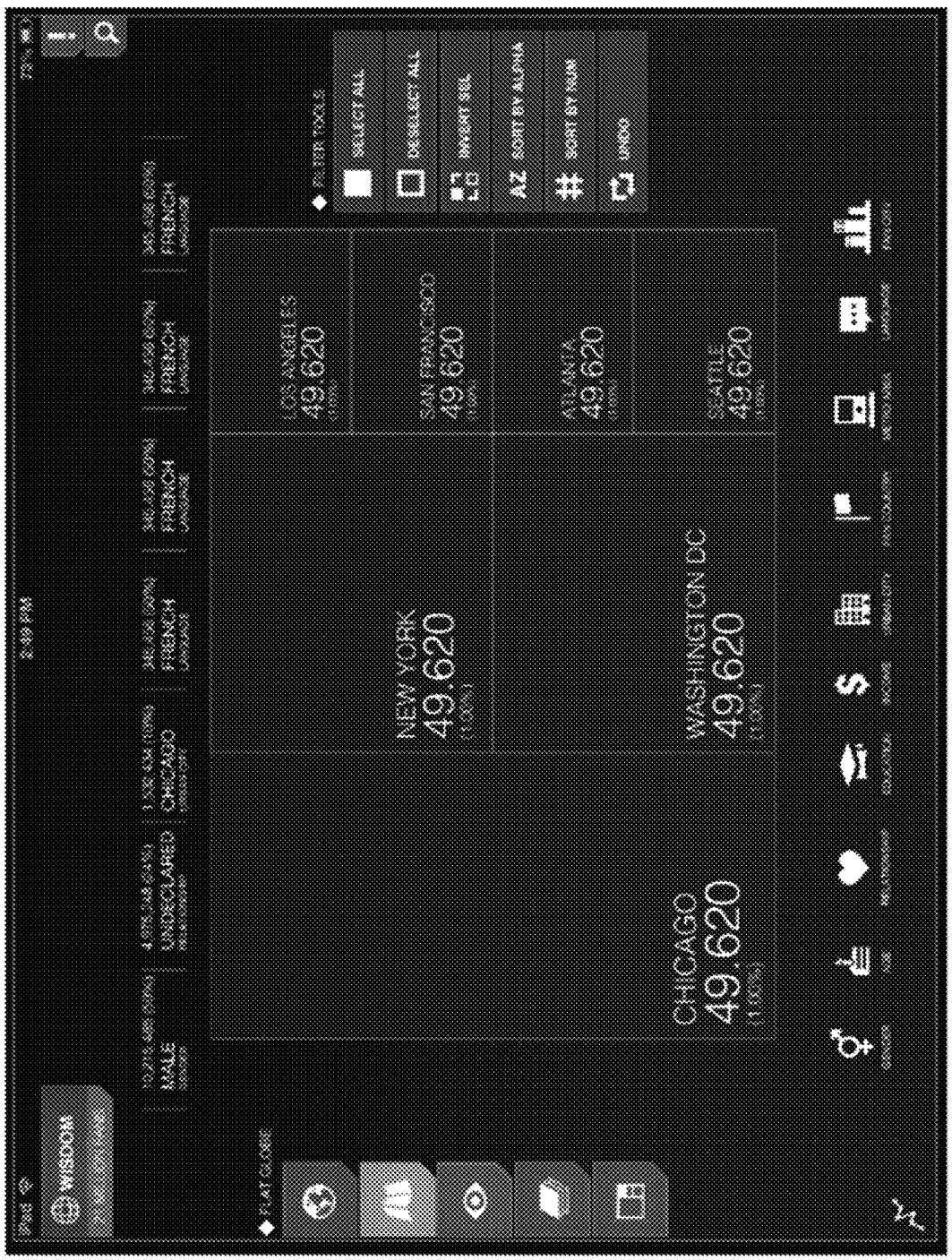

Referring now to FIGS. 8-11, example user interfaces of three-dimensional map-based visualizations are presented. For example, FIG. 8 illustrates graphical lines, or spikes, extending from a three-dimensional globe, representing a bar-graph view of data for different geographic regions. FIG.

9 illustrates a detailed "zoom-in" view of the data, showing detailed categorizations and numerical values for different attributes of the data.

Figure 10:
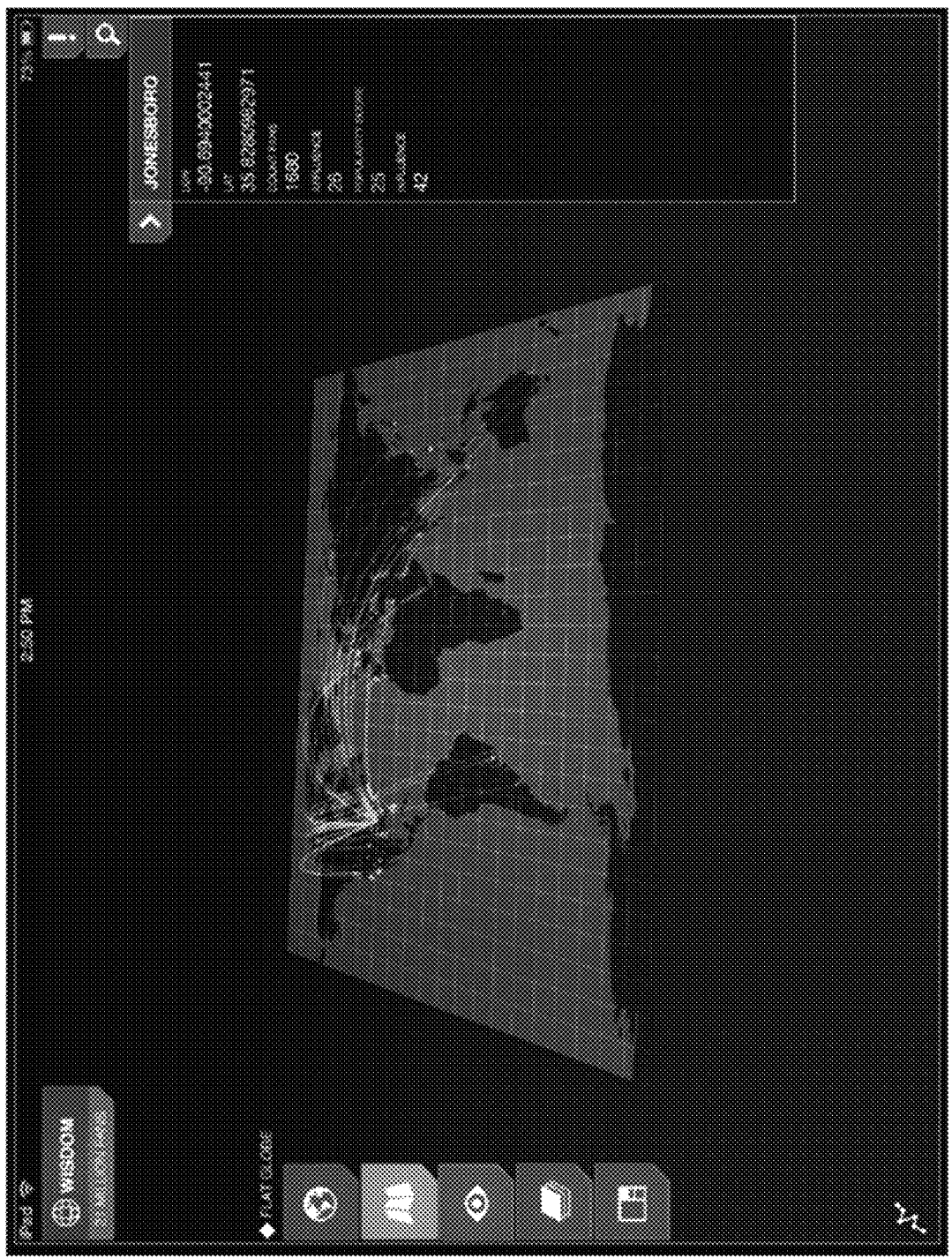
Figure 11:
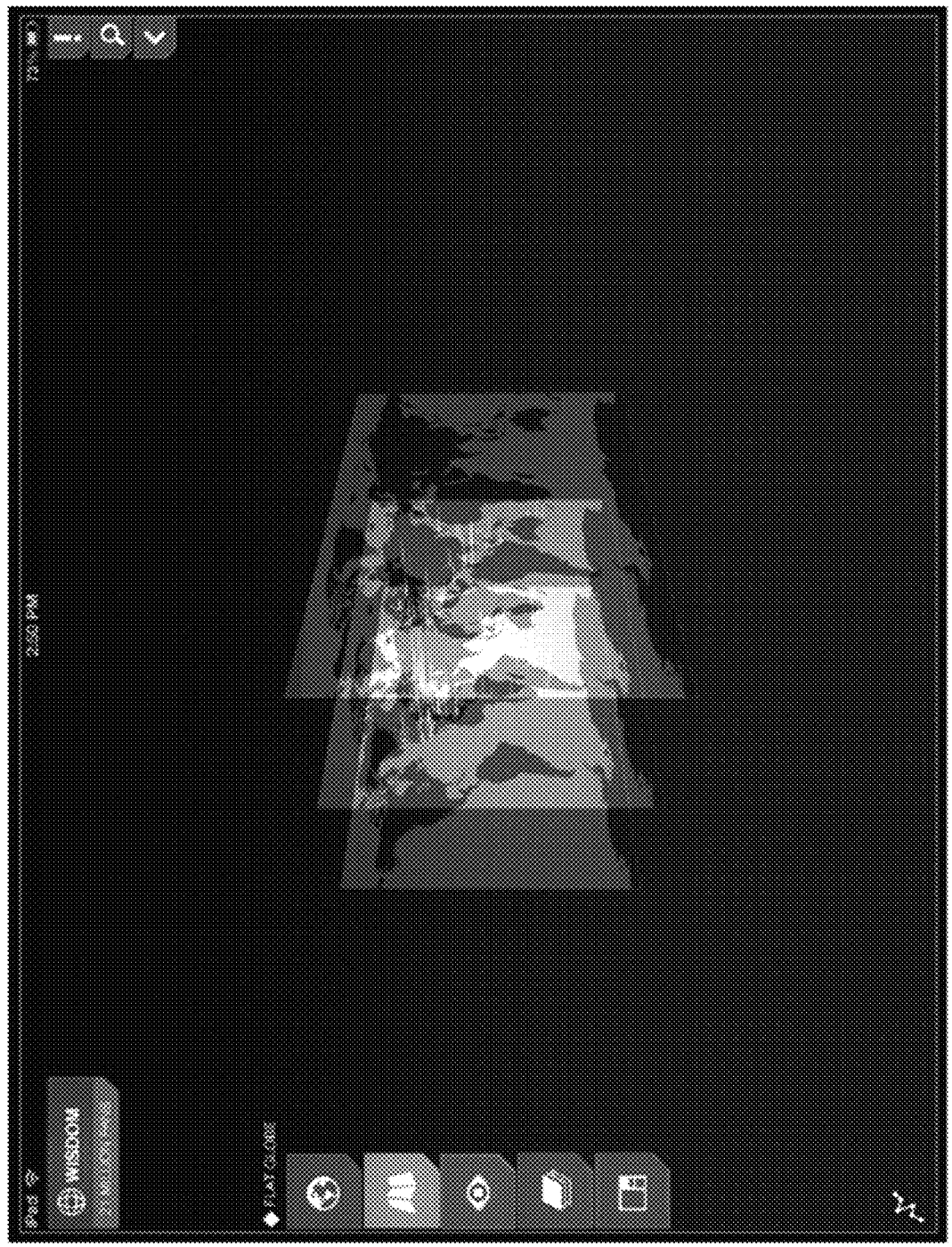

FIG. 10 illustrates another example of a three-dimensional visualization of data, on a flat map with three-dimensional arcs that indicate relationships between different geographic regions on the map. In this example, a user may use touch-based or gesture-based motions to interact directly with the visualization, such as by using a two-finger tap between correlation sub-views. FIG. 11 illustrates a three-dimensional visualization of data that visually separates the data into different layers (e.g., each layer corresponding to a different attribute, such as age, gender, income, etc.).

Figure 12:
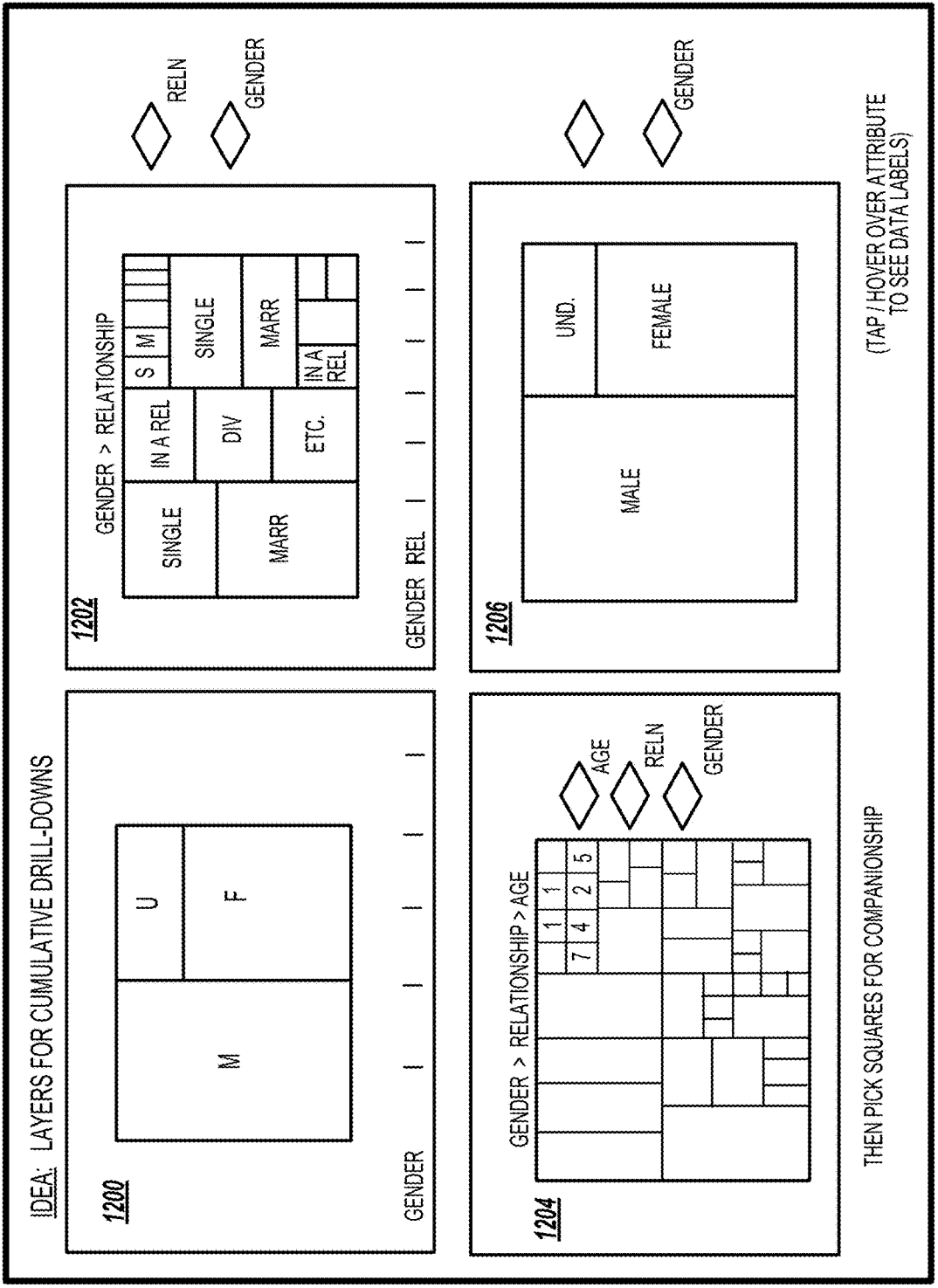

Referring now to FIG. 12, a sketch of example user interfaces that display layering of data are presented. In these examples, the application presents more detailed views (drill-downs) of the data by presenting different attributes (e.g., gender, relationship status, age) in different layers that can be selectively overlapped on top of other layers. For example, user interface 1200 illustrates a visualization of data based on the attribute of gender, with each rectangle representing a particular gender (male, female, or unspecified) and the size of each rectangle representing the relative numerical value corresponding to each gender. User interface 1202 illustrates a visualization of gender data further overlaid with a layer corresponding to the attribute of relationship status (e.g., single, married, in a relationship, divorced, etc.).

In this example, each rectangle of user interface 1200 is sub-divided into smaller regions corresponding to each relationship status (which can be presented in a different format, such as a different color for example, than the rectangles corresponding to gender). User interface 1204 represents yet a further layering of data that combines gender data and relationship status data with age data. In this example, each sub-division of 1202 is further divided again into yet smaller regions, each corresponding to a particular age range (again, these sub-divided regions can be presented in yet a third format, such as a third color, that is different than the rectangles representing gender and relationship status).

In some implementations, the application may enable the user to selectively display the layer(s) corresponding to particular attributes using touch-based or gesture-based commands (e.g., by tapping or hovering over a particular attribute label to display the corresponding layer). The application may also enable the user to select particular rectangles/regions in different layers to compare the data in those regions. Other touch-based or gesture-based operations are possible, wherein the user can interact directly with the visualization(s) of data.

Figure 13:
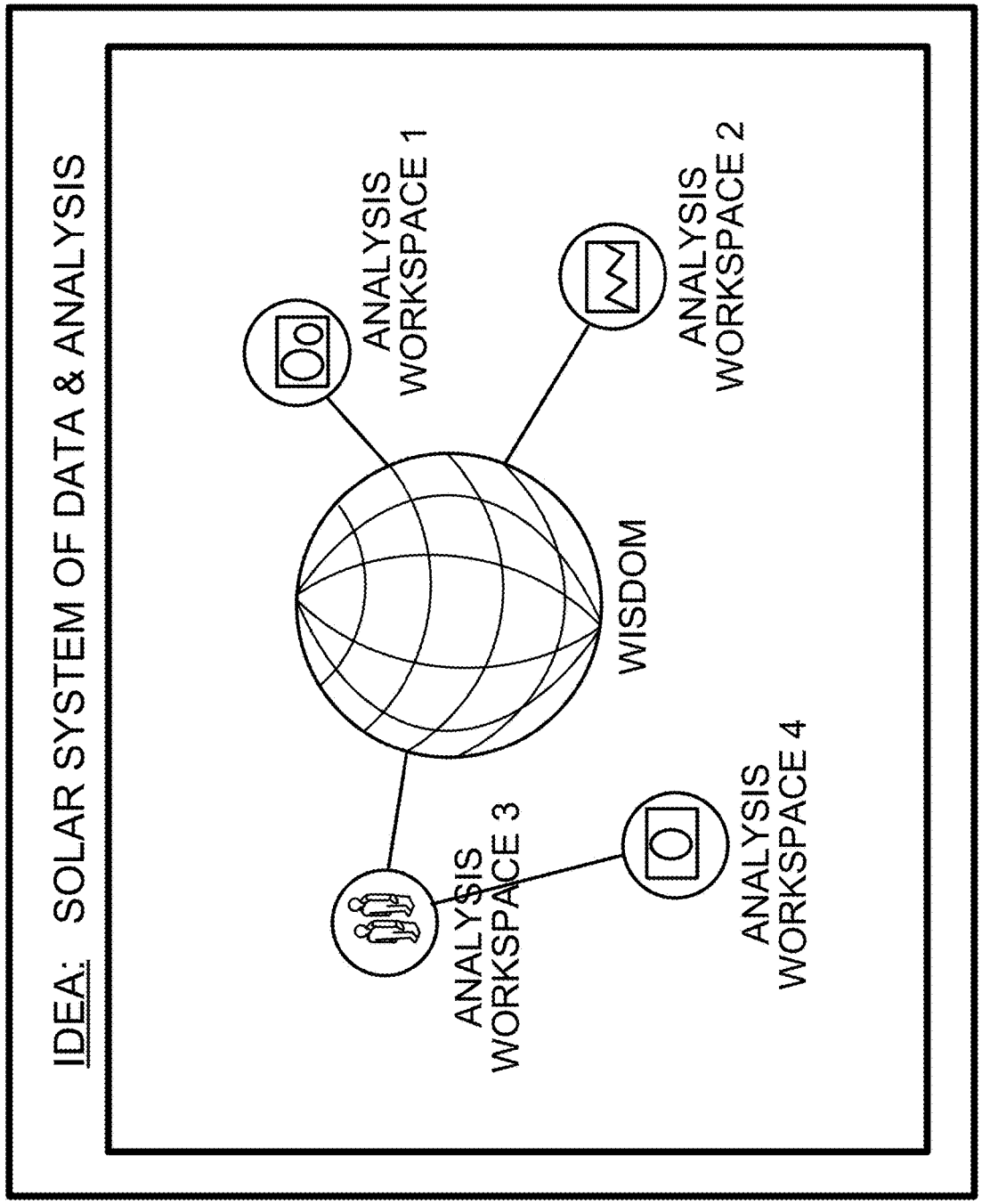
FIG. 13 is a sketch illustrating an example data discovery and visualization system.

Referring now to FIG. 13, a sketch illustrating an example data discovery and visualization system is illustrated. In this example, the data (represented by the central globe) is utilized in various analysis workspaces (e.g., analysis workspaces 1, 2, 3, and 4). Each analysis workspace allows a user (or different users) to perform different types of exploration on the same set of data using different types of visualizations. In some implementations, one or more workspaces may be related (e.g., workspaces 3 and 4).

Figure 14:
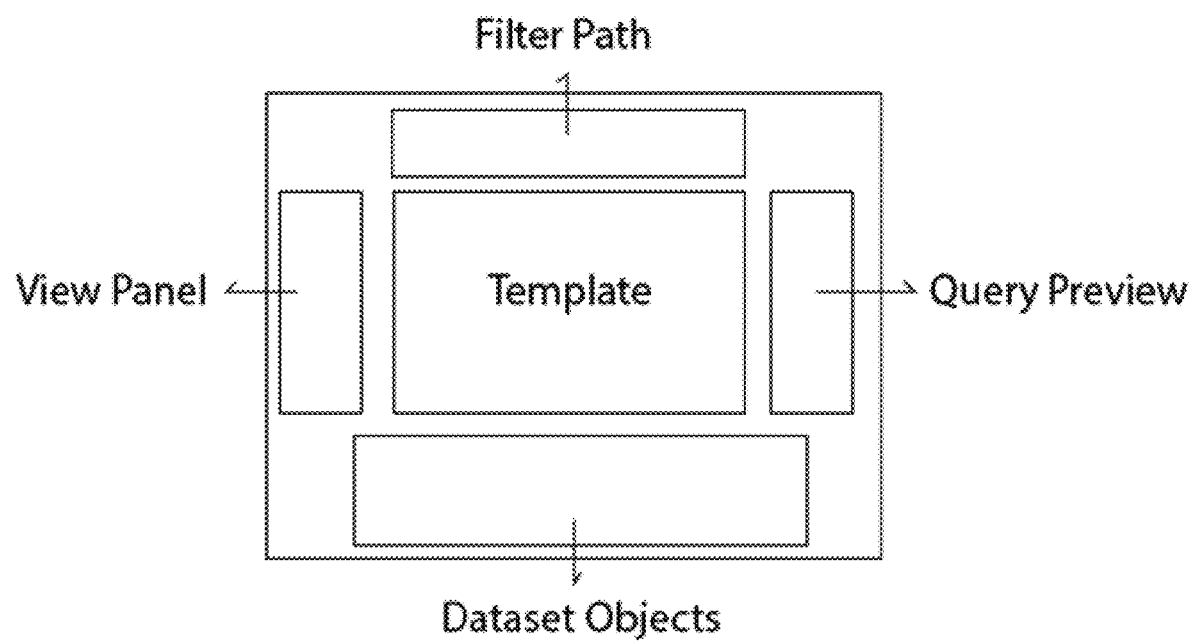
FIGS. 14-33 are diagrams illustrating example processes for enabling data discovery and data visualization.

Referring now to FIGS. 14-33, example user interfaces and operations on those user interfaces are presented. For example, FIG. 14 illustrates the structure of an example user interface (UI). In this example, the UI may include a template for a visualization of data. The UI may also include a filter path for performing filtering operations on the data.

The UI may also include a view panel for selecting different visualizations or operations on the data. The UI may also include a query preview for previewing results of a user-defined query on the data.

Figure 15:
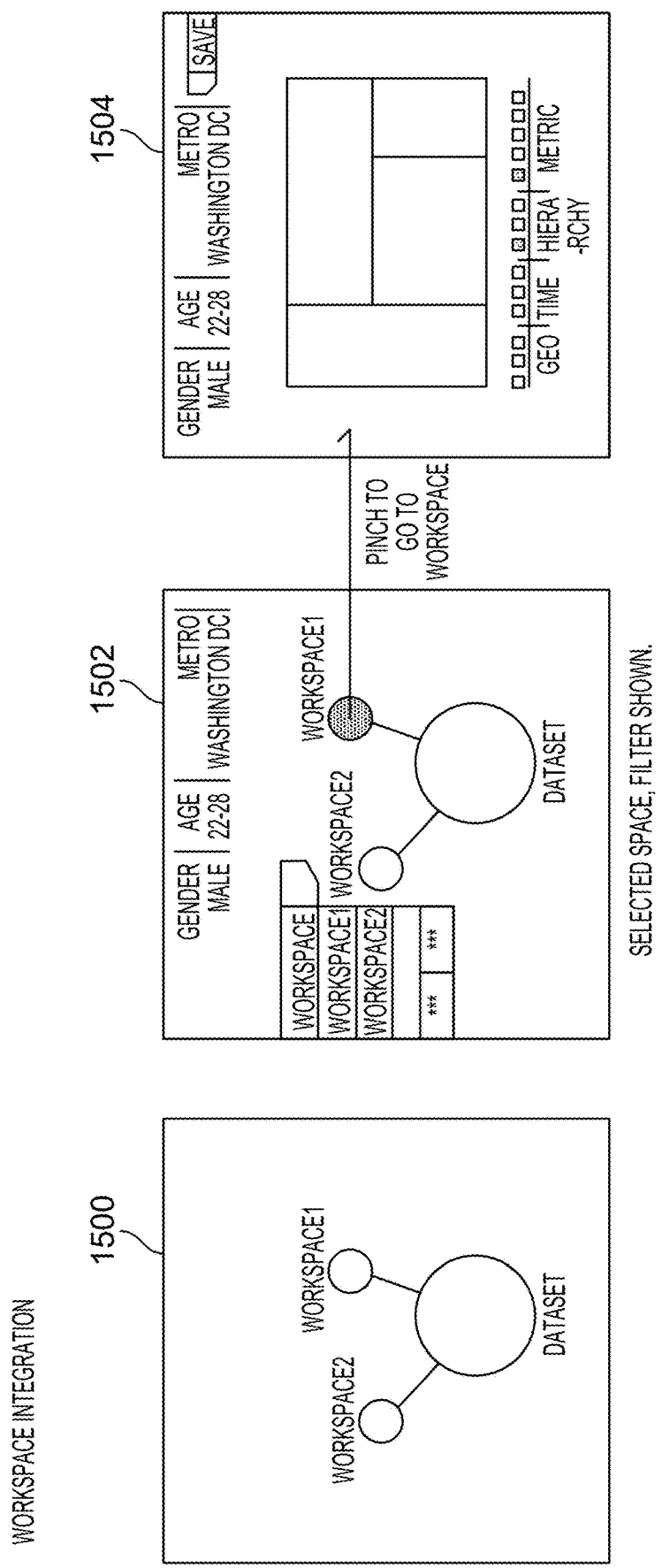

Referring now to FIG. 15, an example of workspace integration is presented. In this example, two different workspaces (workspace 1 and workspace 2) are shown, in UI 1500, using a common dataset. In UI 1502, workspace 1 is selected and the corresponding filter on the dataset is shown. The UI may enable a user to perform a touch-based or gesture-based control (e.g., pinch) to view further details of workspace 1. These details are shown in UI 1504, which illustrates a visualization of the data in workspace 1.

Figure 16:
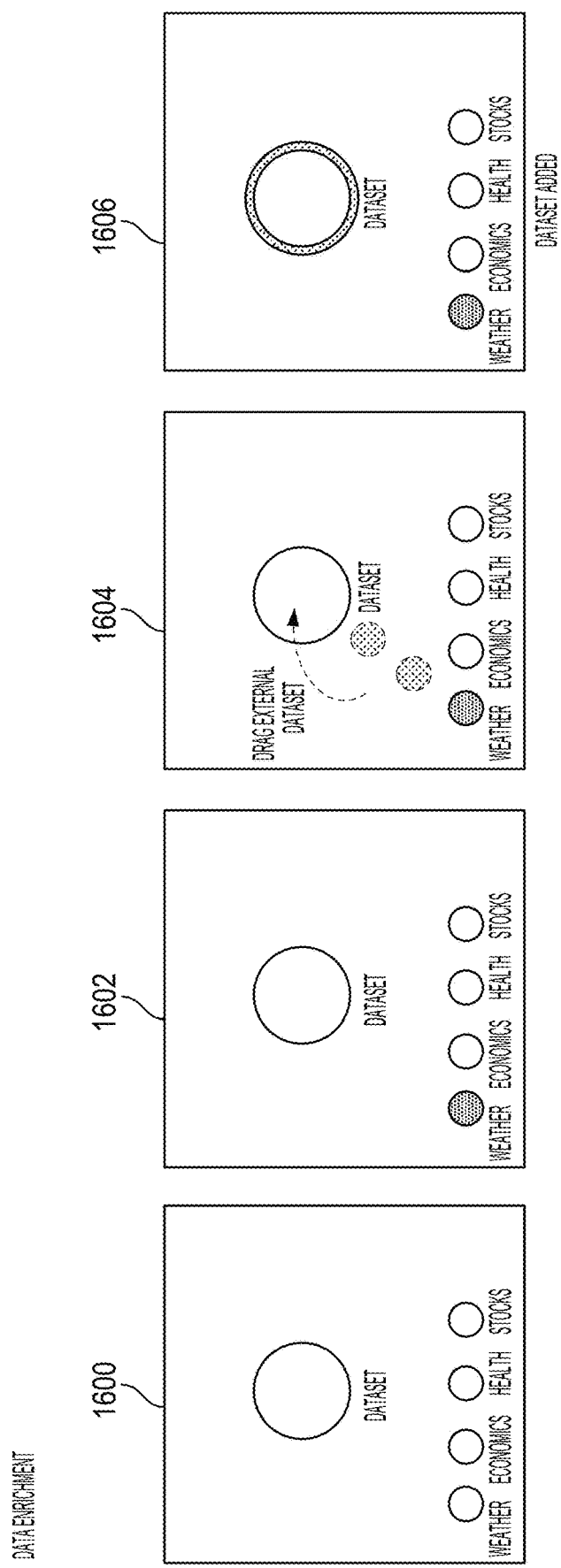

Referring now to FIG. 16, an example of data enrichment is presented. In this example, various UIs are illustrated that show a process of adding more data to an existing data set. For example, UI 1600 shows a data set and four additional types of data: weather, economics, health, and stocks. In UI 1602, a user selects the additional data of weather. In UI 1604, the user performs a gesture-based operation (e.g., dragging-and-dropping) to move the selected weather data into the dataset. UI 1606 illustrates the result of adding the weather data to the data set, resulting in an enriched data set.

Figure 17:
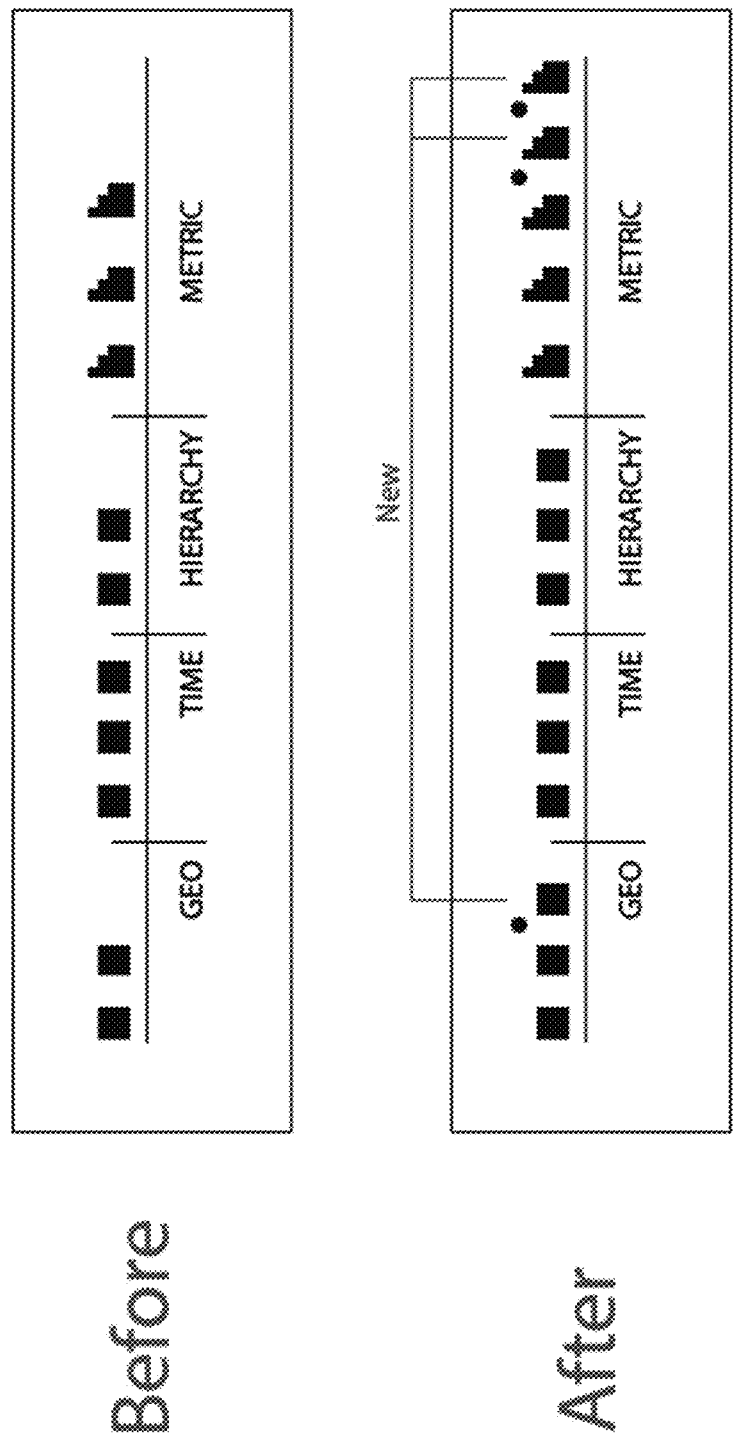

Referring now to FIG. 17, an example of data enrichment is presented, in which different attributes and metrics may be supplemented by externally added data (e.g., weather data in FIG. 16). In this example, adding external data to an existing data set results in an additional geographic attribute as well as two additional metrics. As such, adding new data to a data set may result in not only supplementing the raw data itself, but also supplementing specific attributes and/or metrics associated with the data set and externally added data.

Figure 18:
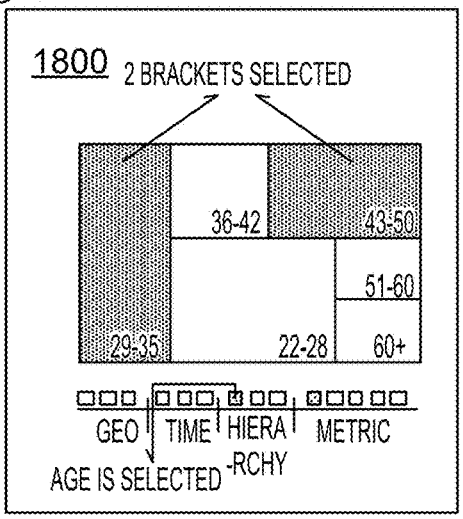
Figure 18:
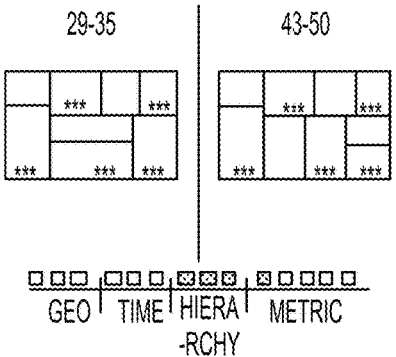
Figure 18:
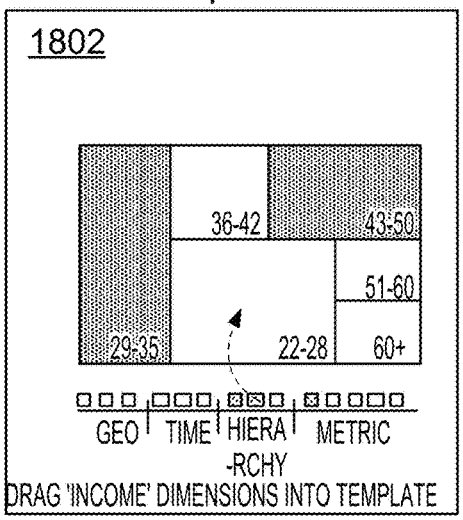
Figure 18:
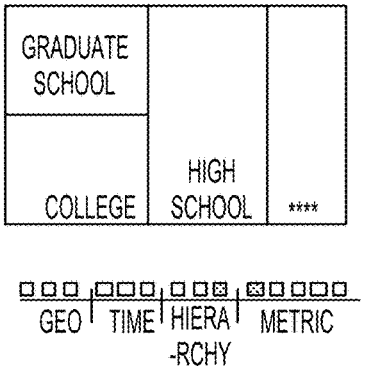
Figure 18:
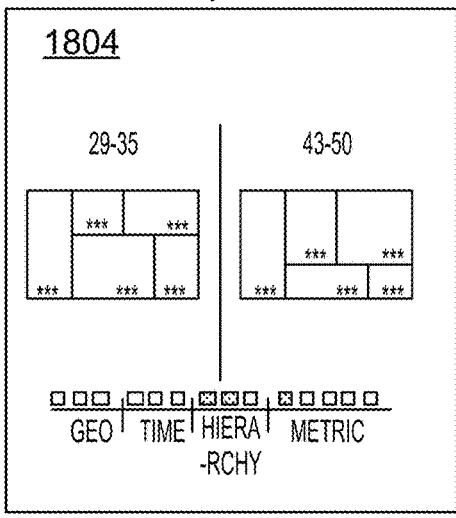
Figure 18:
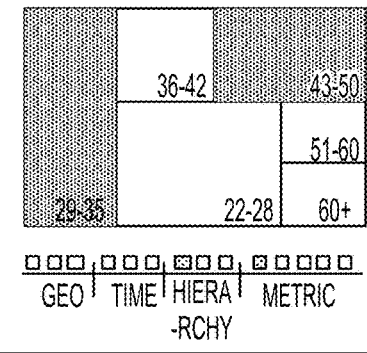

Referring now to FIG. 18, an example of comparing two different elements of data is presented. In this example, in UI 1800, the attribute of age is illustrated as being selected as a first hierarchy. In addition, two different elements (brackets) are selected, corresponding to age ranges 29-35 and 43-50. In UI 1802, a second attribute of income is illustrated as being selected as a second hierarchy, and is added to the existing template (e.g., by a user performing a select-and-drag gesture directly on the visualization). As a result, in UI 1804, the two age ranges are illustrated separately, each subdivided into smaller regions corresponding to different income levels. Subsequently, the user may perform various operations on the resulting visualization hierarchy, such as dragging an additional attribute into the template as a third hierarchy that further subdivides each income region (e.g., in UI 1806), or selecting a new attribute to display a new visualization of the data, such as one based on education level (e.g., in UI 1808), or deselecting a previously selected attribute to remove the corresponding layer from the visualization hierarchy, leaving the remaining layer displayed in the visualization (e.g., in UI 1810, deselecting income to leave the age range visualization layer).

Figure 19:
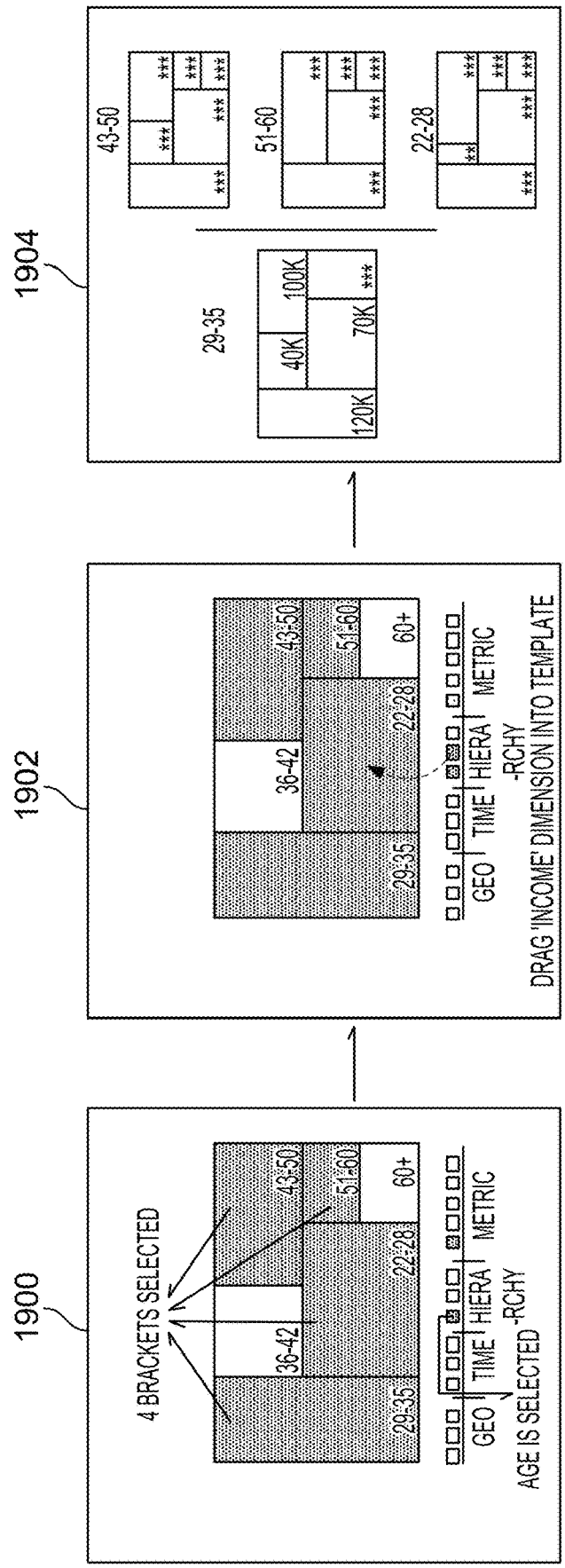

Referring now to FIG. 19, an example of comparing multiple elements of data is presented. In this example, UI 1900 illustrates the selection of four different regions (brackets) of data, corresponding to four different age ranges. In UI 1902, the user drags an additional attribute of income into the template, resulting in an overlaid hierarchy of different income levels in each of the four different age ranges, shown in UI 1904.

Figure 20:
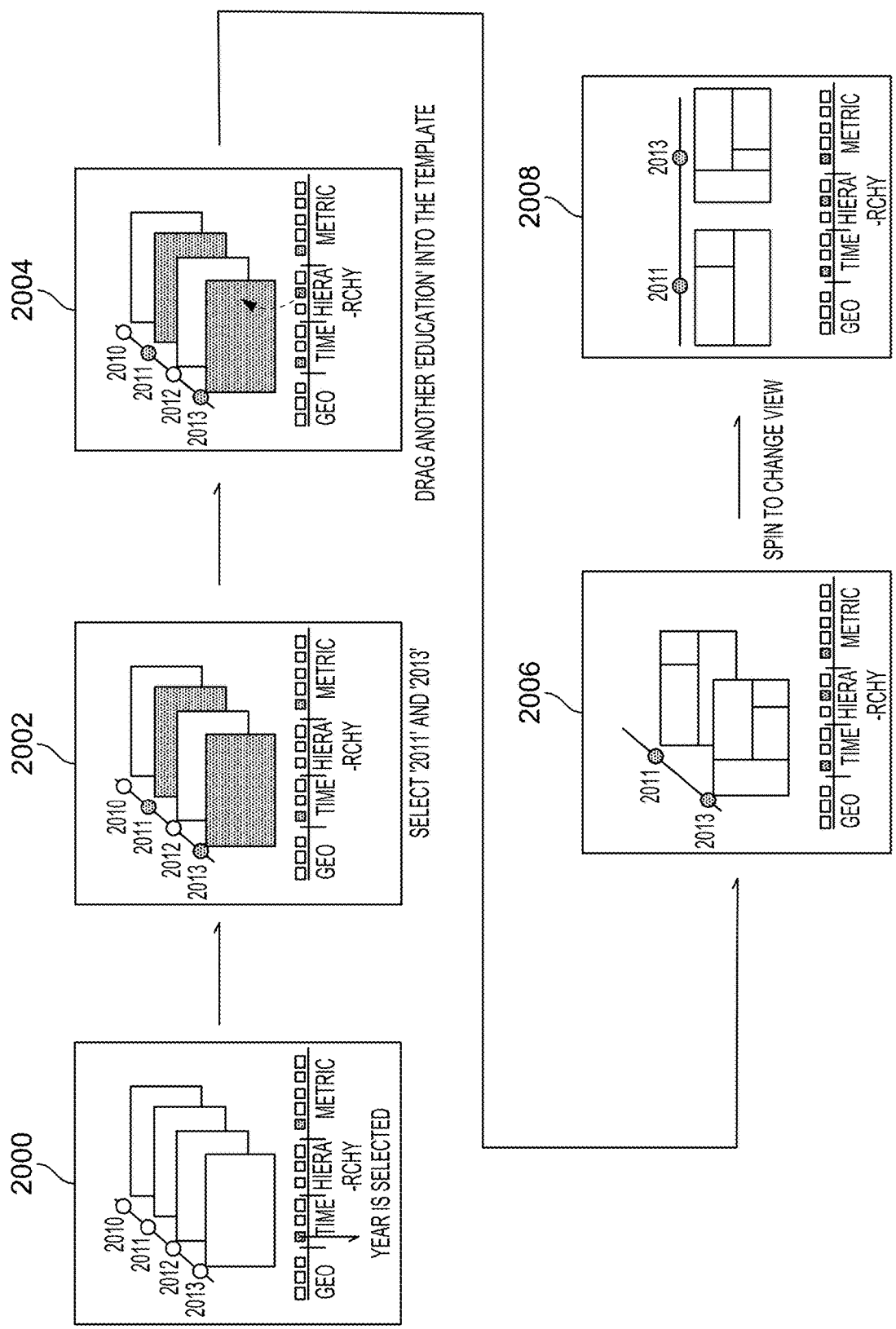

Referring now to FIG. 20, an example of comparing different elements of data based on a temporal attribute is presented. In this example, in UI 2000, the attribute of year is selected, resulting in an overlaid visualization of four different sets of data corresponding to years 2010, 2011, 2012, and 2013. In UI 2002, the user selects years 2011 and 2013, resulting in those layers being highlighted. In UI 2004, the user adds an additional layer of data corresponding to education into the template (e.g., by dragging and dropping the corresponding icon into the visualization). As a result, in UI 2006, the visualization displays only the years 2011 and 2013, with the corresponding layers subdivided into different regions for various education levels. The application may enable the user to perform further gesture or touch based operations on the visualization to further manipulate the data. For example, in UI 2008, the user can perform a gesture-based operation (e.g., spinning the visualization) to change to a different view, such as from the perspective view in UI 2006 to a flattened view in UI 2008, which shows the layers for years 2011 and 2013 side-by-side.

Figure 21:
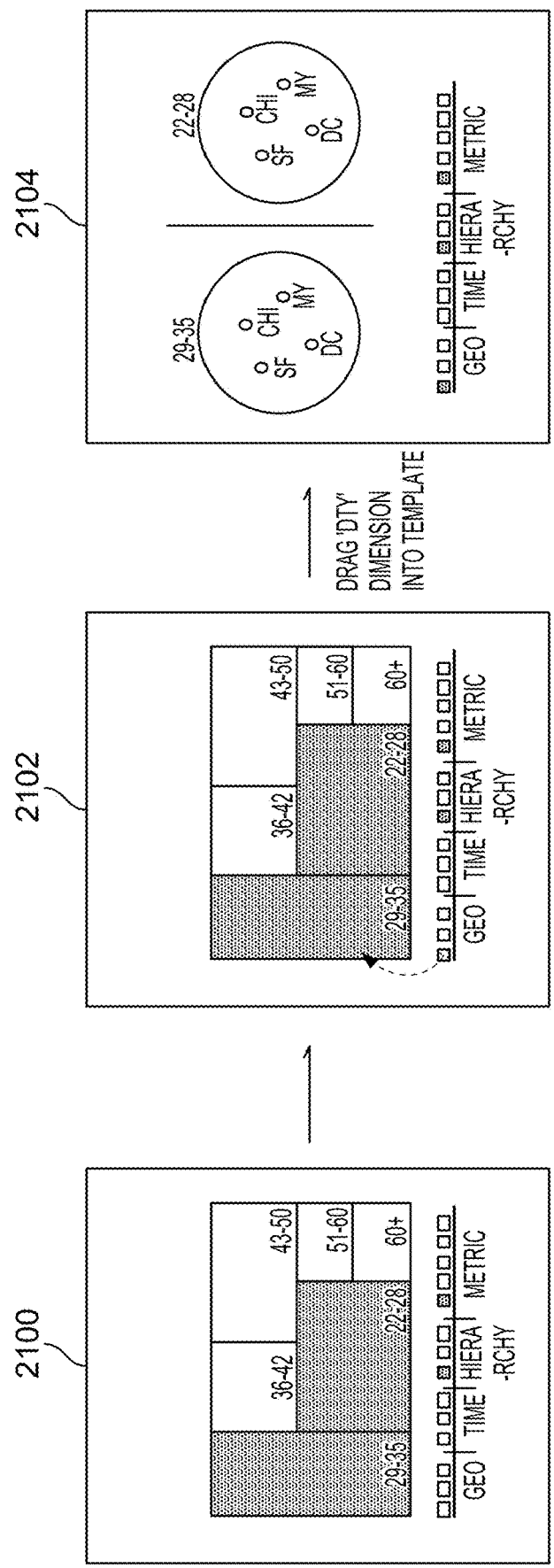

Referring now to FIG. 21, an example of comparing different elements of data based on a geographic attribute is presented. In this example, UI 2100 illustrates a layer of data that is visualized based on the age attribute, where two different ranges of age are selected, corresponding to 29-35 and 22-28. In UI 2102, the user drags and drops an attribute of geography (e.g., city) into the age-based visualization template. This results in a new visualization, shown in UI 2104, in which the two selected age ranges are shown split, each having a further layer of geographic data (e.g., different cities) overlaid on top. As a result, the application allows a user to easily visualize the different cities in which people of different age ranges reside.

Figure 22:
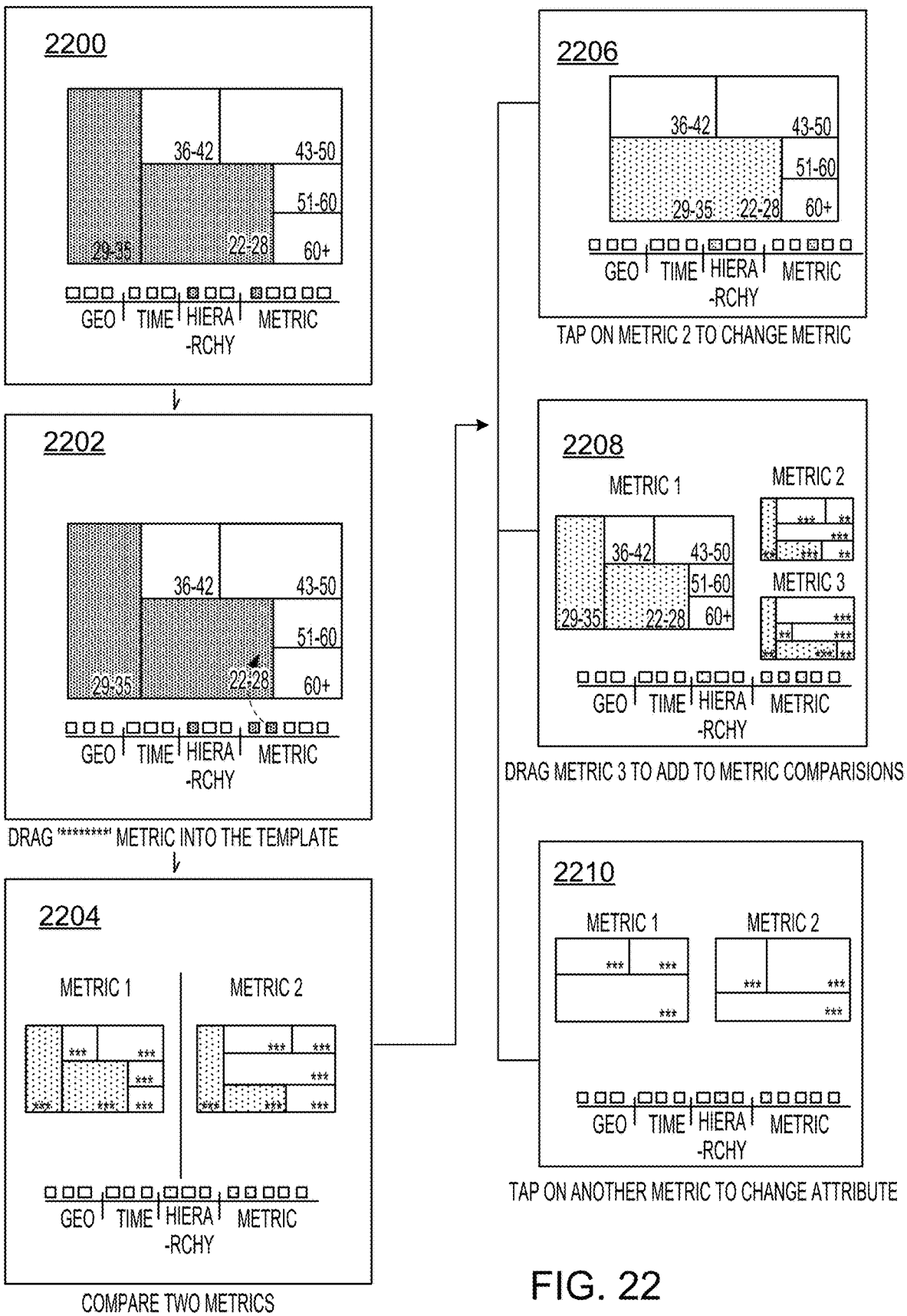

Referring now to FIG. 22, an example of comparing data based on two different metrics, and in particular using a tree map, is presented. In this example, UI 2200 illustrates a layer of age-based data, in which two different age ranges are selected, corresponding to 29-35 and 22-28. In this example, a first metric his selected to present the visualization. In UI 2202, the user selects a second metric (e.g., the economics metric) and drags and drops the second metric into the template. This results in UI 2204, in which the data for the two selected metrics are displayed side-by-side, with the different age ranges shown as rectangular regions whose sizes correspond to the selected metrics. From here, the application may enable the user to perform various operations. For example, in UI 2206, the user may select an entirely new metric to visualize by performing a particular touch-based operation (e.g., by tapping on the icon corresponding to the new metric). In UI 2208, the user may instead add the new metric as an additional third metric with which to compare the two previously selected metrics by performing a different touch-based or gesture-based operation (e.g., by dragging-and-dropping the third metric into the visualization of UI 2204).

As such, the application may enable the user to specify different operations on data by performing different touch-based or gesture-based operations directly on the visualization of the data, without necessarily requiring the user to form traditional navigate-and-select operations with a menu driven interface. In yet another example, in UI 2010, the user may select an entirely new attribute (e.g., relationship status, instead of age) to change the visualization of the data to the new attribute in combination with the previously selected two metrics.

Figure 23:
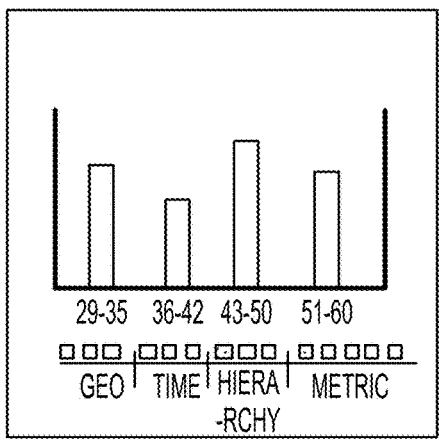
Figure 23:
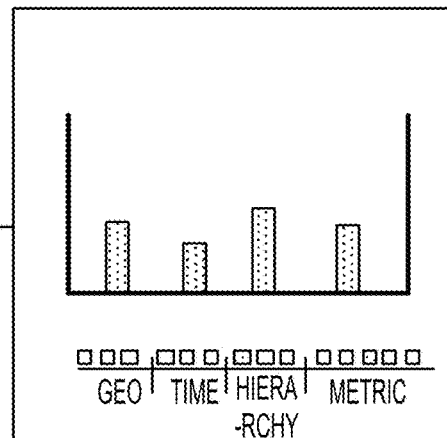
Figure 23:
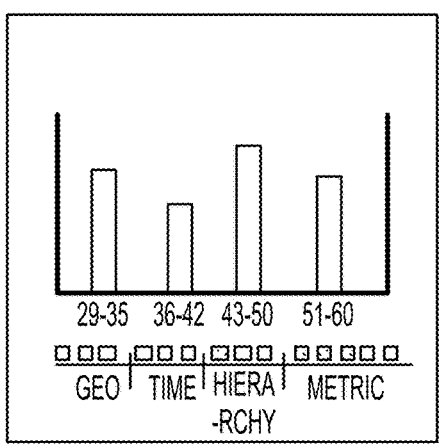
Figure 23:
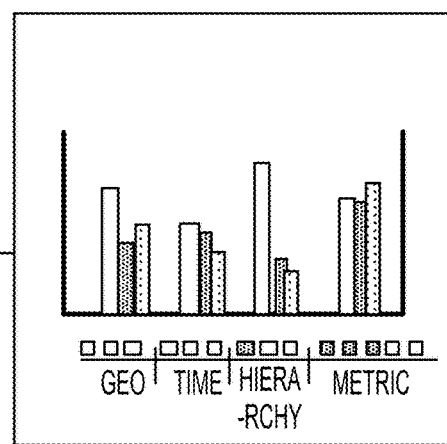
Figure 23:
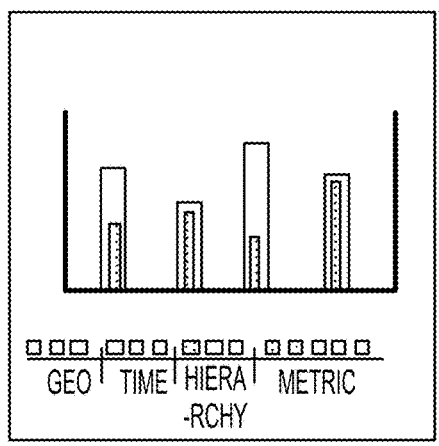
Figure 23:
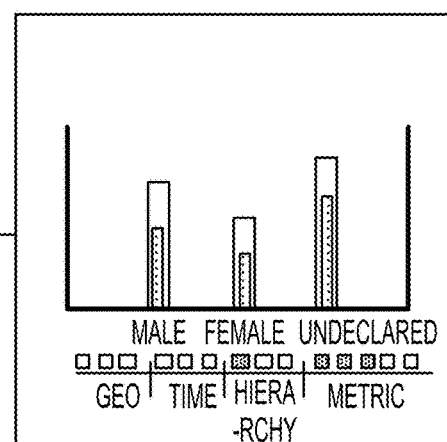

Referring now to FIG. 23, a similar process of comparing data based on different metrics as in FIG. 22 is presented, wherein the data is represented by bar graphs instead of tree based rectangular regions of FIG. 22.

Figure 24:
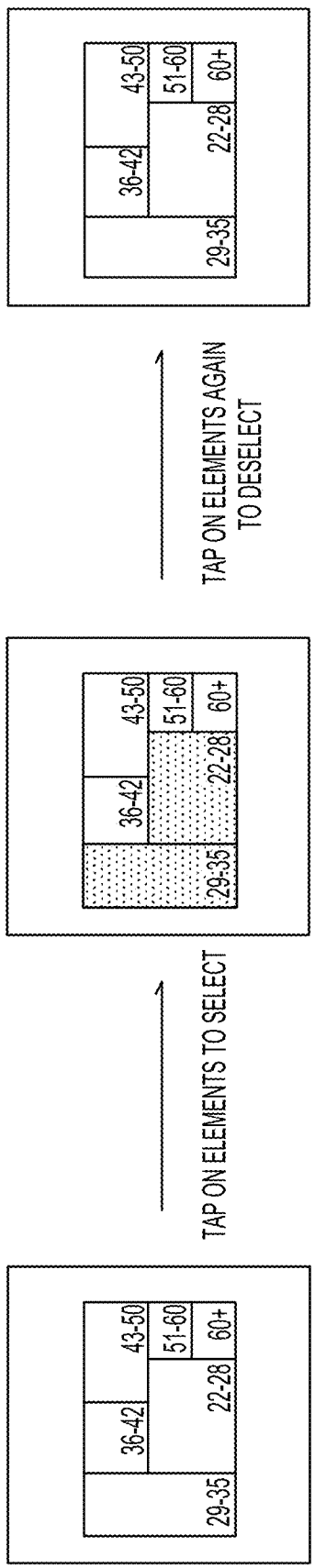
Figure 25:
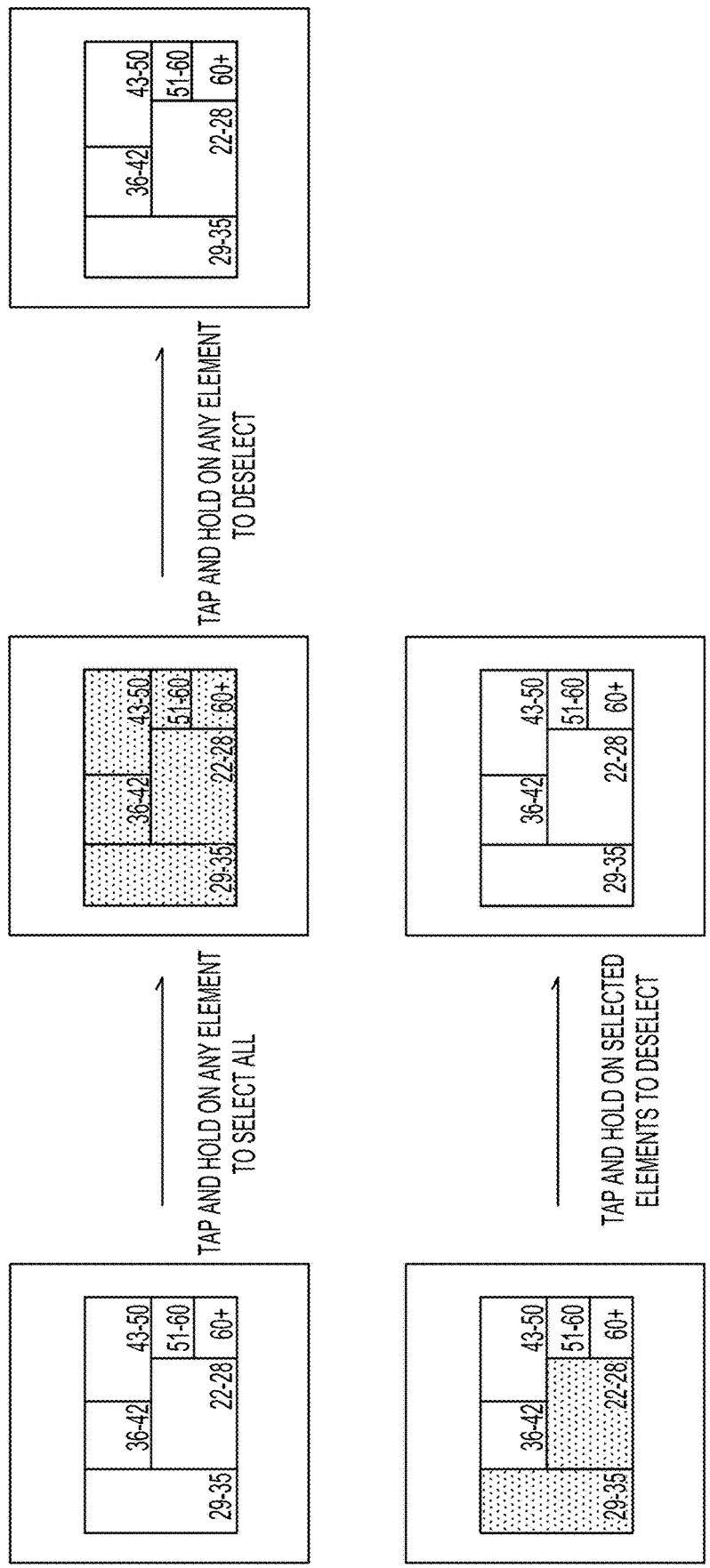
Figure 26:
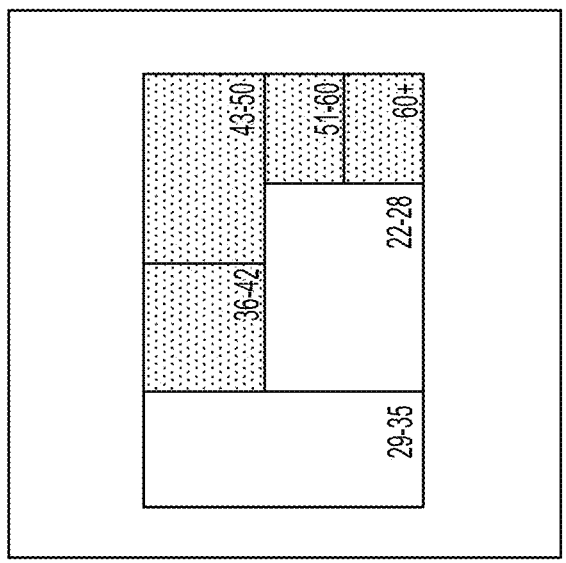
Figure 26:
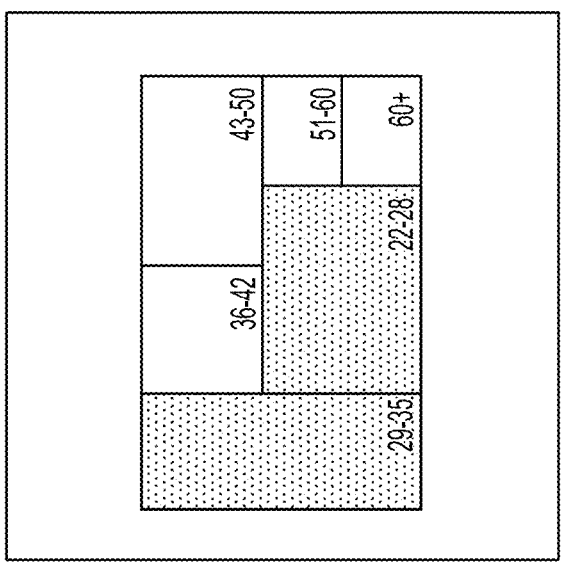

Referring now to FIGS. 24, 25, and 26, different select and deselect operations that a user can perform directly on the visualizations of the data are presented. For example, FIG. 24 illustrates a select and deselect operation on particular elements of data (e.g., by tapping on elements to select and tapping on the same elements to deselect). FIG. 25 illustrates a select-all and deselect-all operation that a user can perform on the data (by tapping and holding on any element to select all, and tapping and holding on any element to deselect). FIG. 26 illustrates an inversion operation, in which a user may invert the elements which are selected (e.g., by using a two finger tap and hold on both the selected and deselected areas to swap selection).

Figure 27:
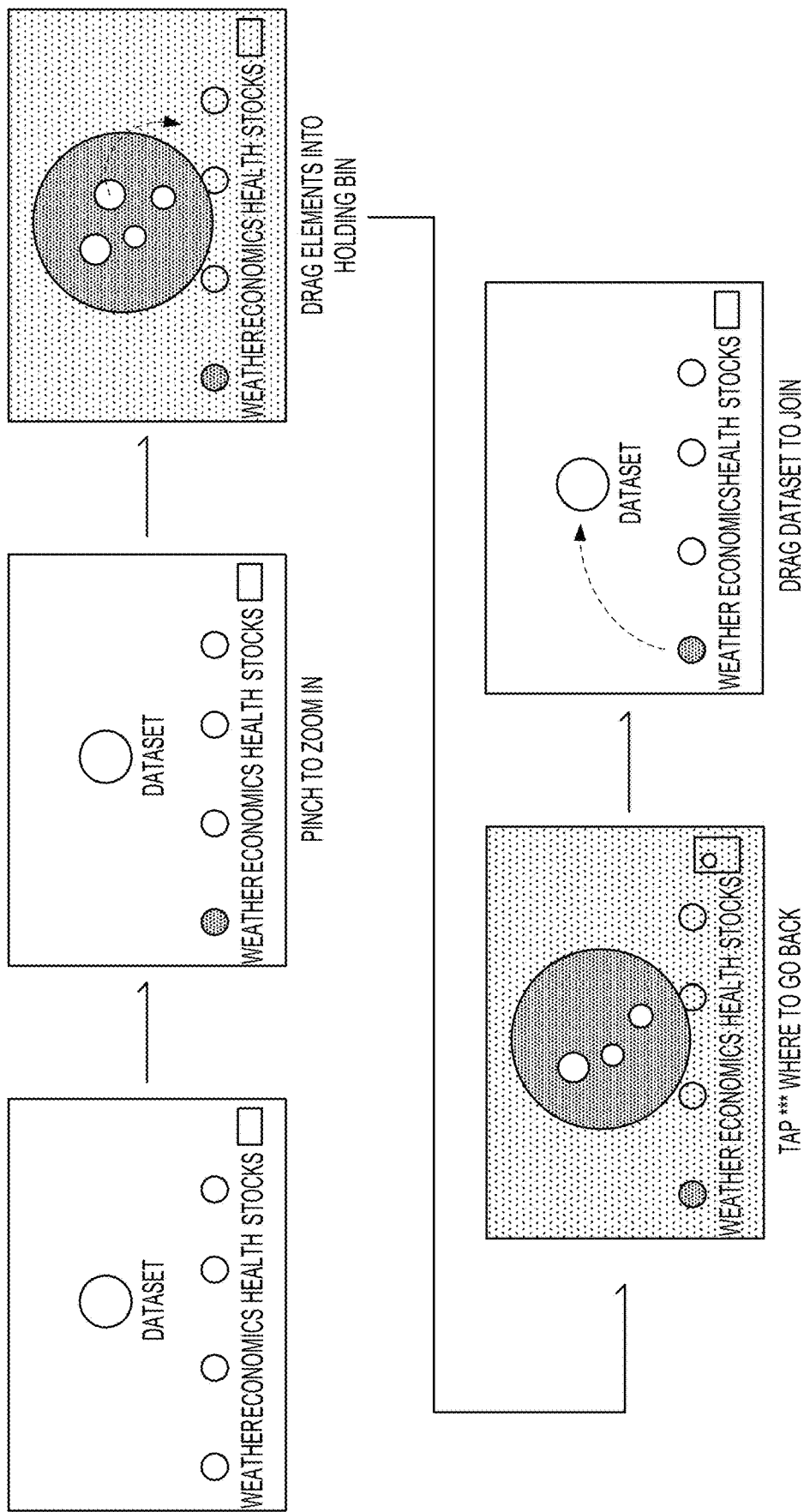
Figure 28:
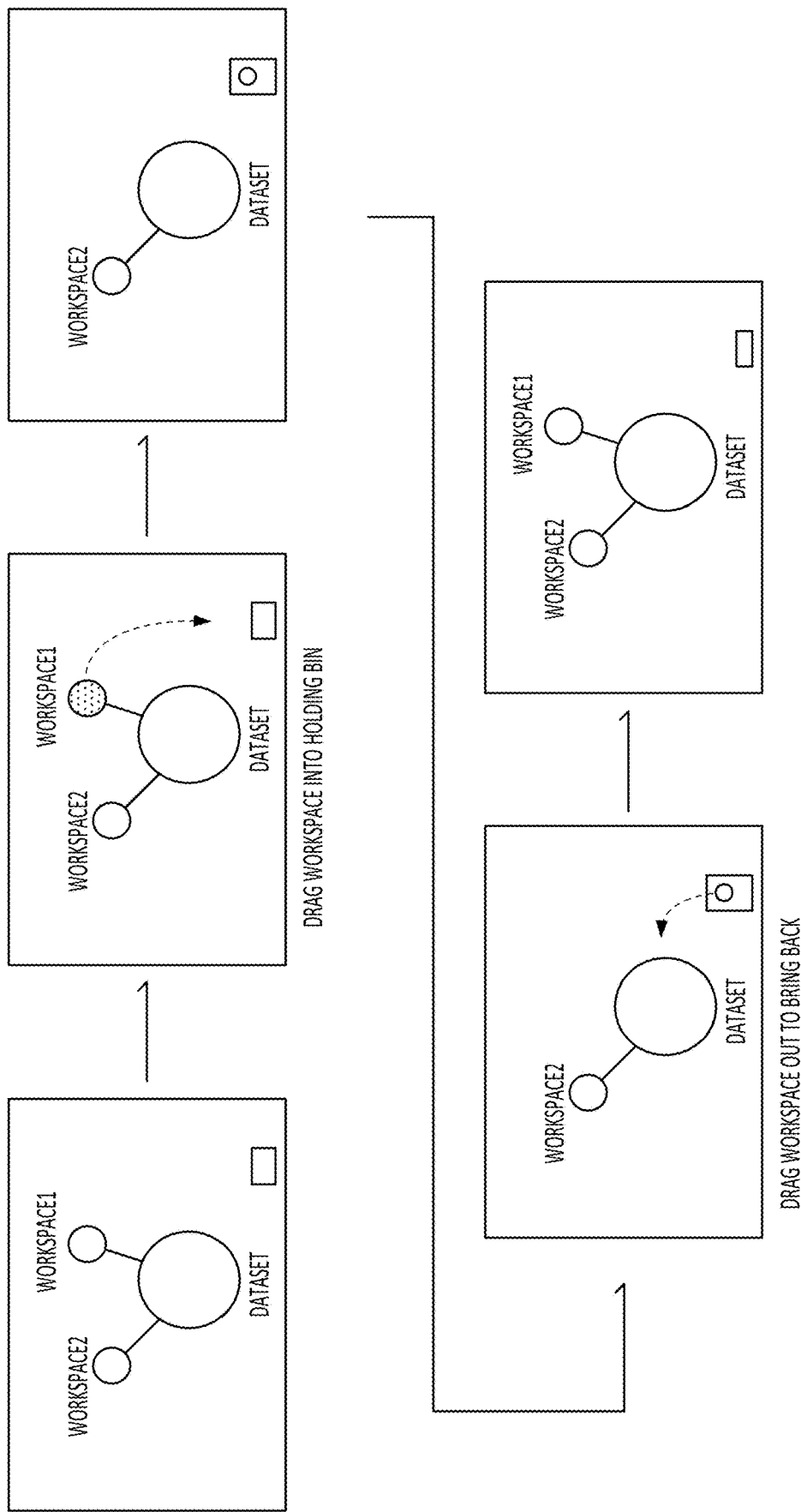
Figure 29:
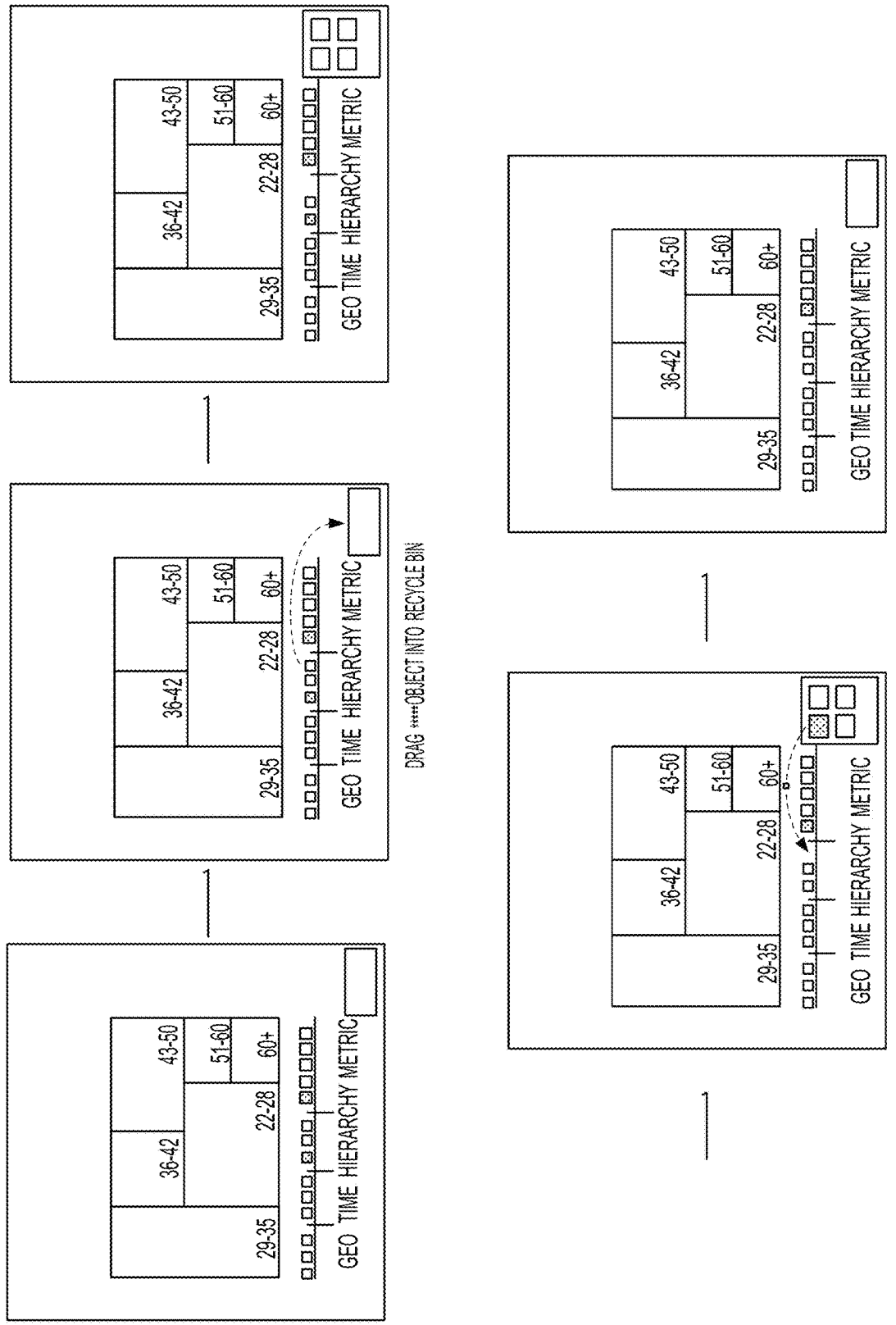
Figure 30:
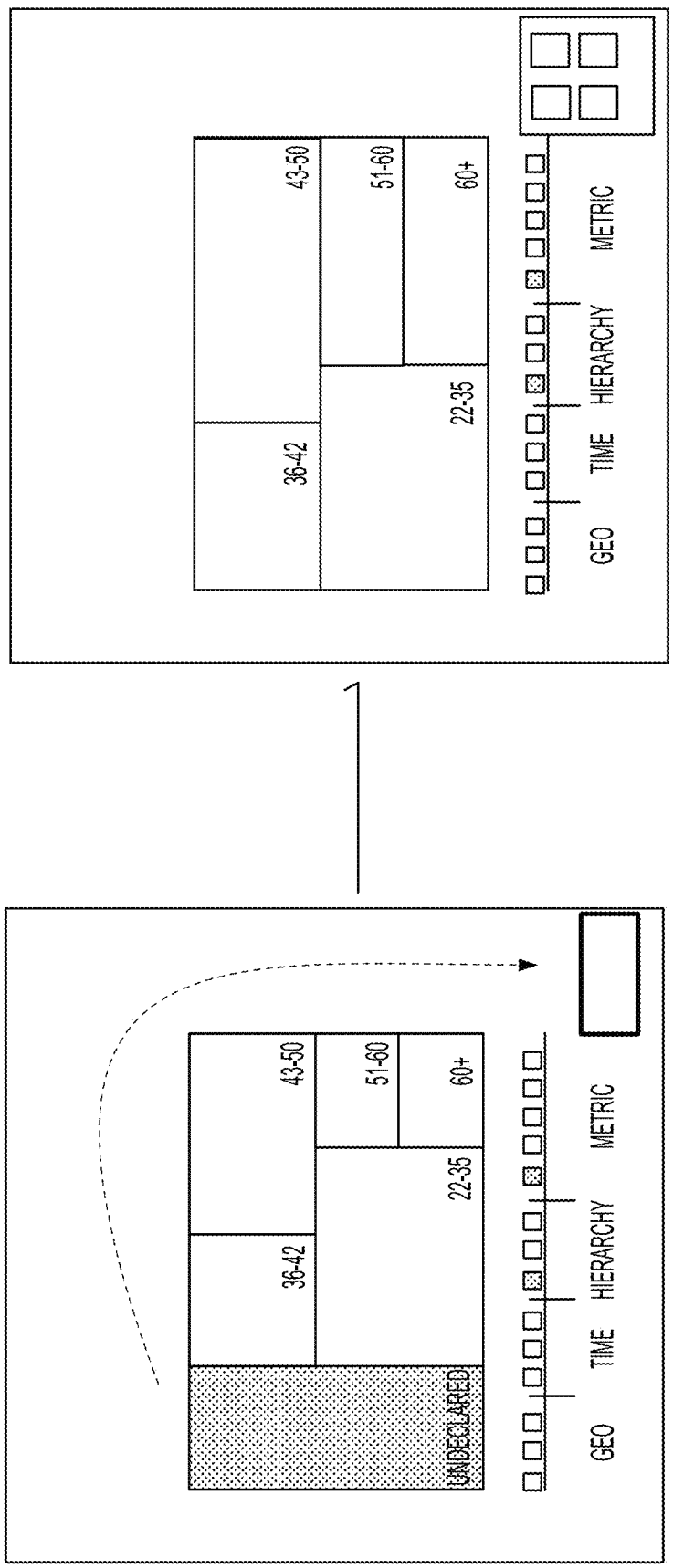

Referring now to FIGS. 27-30, examples of utilizing holding bins to temporarily store different types of data are presented. While such data is held in the holding bins, further operations may be performed on the remaining data in the visualization template. The data in the holding bins can be added back to the template at a subsequent time. For example, FIG. 27 illustrates an example of using a holding bin to store an external data set, such as weather data. As another example, FIG. 28 illustrates using a holding bin to temporarily store segments of data, such as work spaces. As another example, FIG. 29 illustrates using a holding bin to temporarily store data objects, such as an attribute. As yet a further example, FIG. 30 illustrates using a holding bin to temporarily store object elements, such as a particular age range in a visualization. In each of these examples, the portion of data that is stored in the holding bin can be moved back into the visualization template, for example by a user dragging and dropping the data portion into and out of the holding bin.

Figure 31:
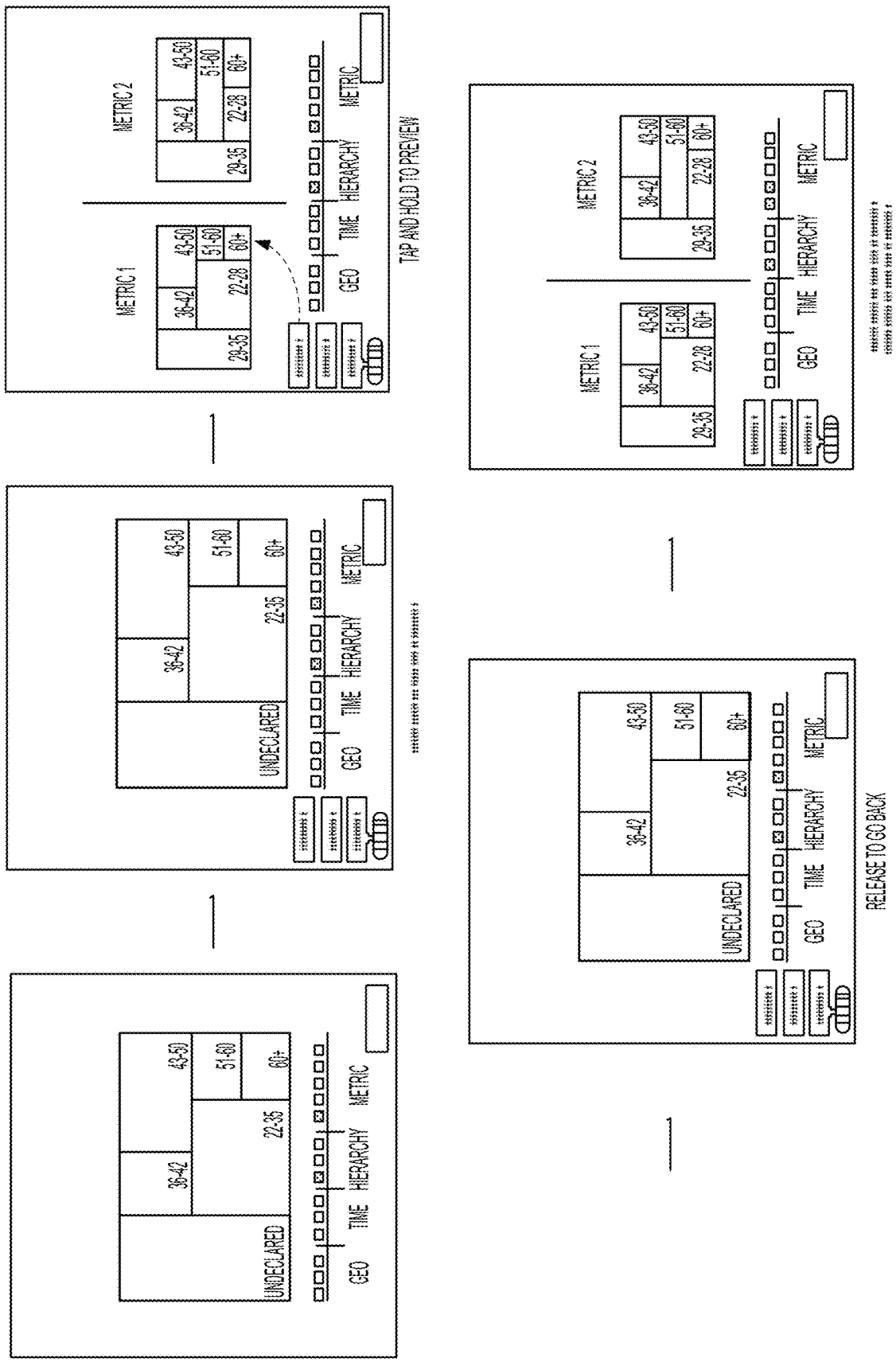
Figure 32:
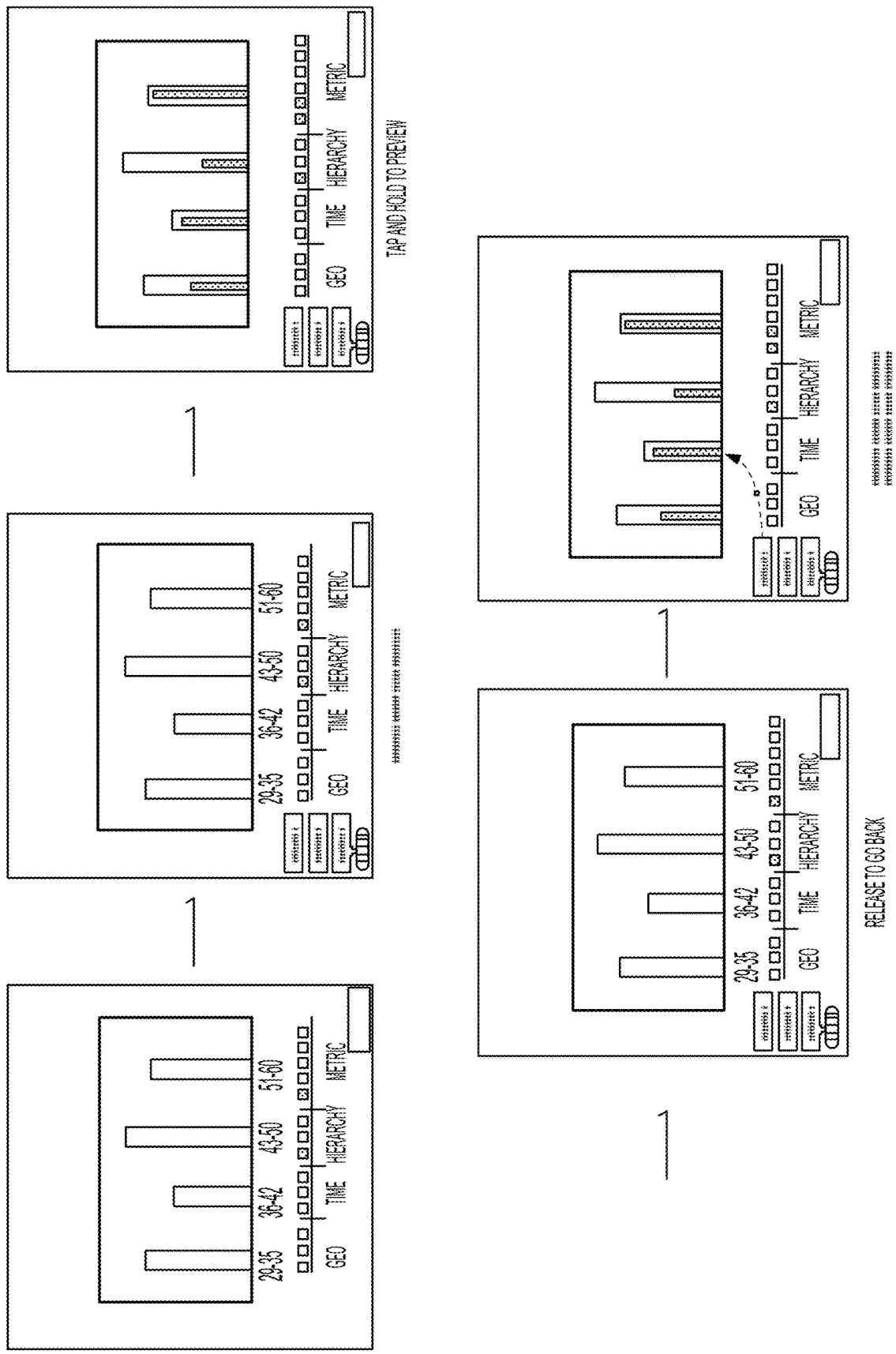
Figure 33:
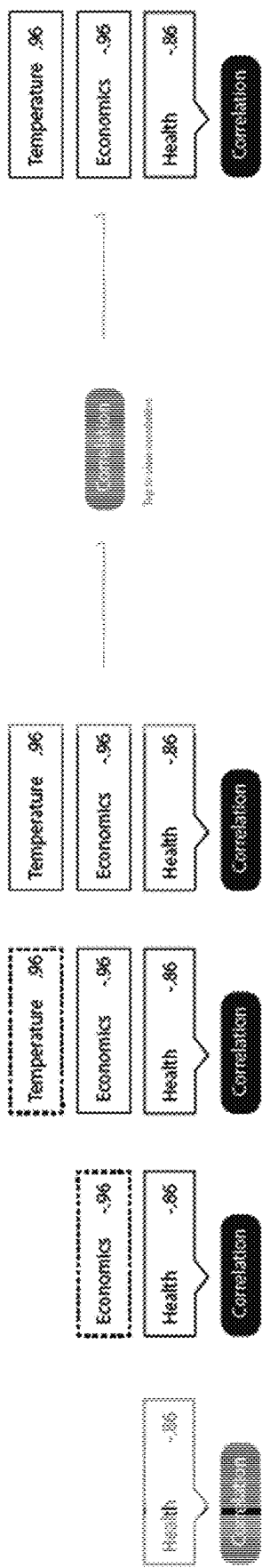

Referring now to FIGS. 31-33, example user interfaces are presented that illustrate the process of correlating different data. For example, FIG. 31 illustrates an example of using a tree map to correlate different elements of data. In this example, the visualization template illustrates different ranges of age, based on a particular metric selected. When a correlation with another metric is found, the application may automatically display a window (e.g., using a bubble-up graphic) that displays different metrics ranked by correlation. The user may either temporarily preview the metric comparison (e.g., by tapping and holding the new metric in the bubbled-up window), or may add the new metric to the data set by dragging and dropping the new metric into the template, resulting in a side-by-side comparison of the new metric with the existing metric.

FIG. 32 illustrates an example process of metric correlation that is similar to that in FIG. 31, with the exception that a bar graph is used to visualize the data. In this example, the data for different metrics may be compared by overlaying the corresponding bar graphs on the visualization template. Similar touch-based and gesture-based operations may be used to either preview the new metric or add the metric into the template for comparison.

FIG. 33 illustrates an example of further details of the bubble-up window and correlation buttons that may be displayed by the application for a correlation analysis. In this example, a new metric for correlation may be first indicated in an alternate graphic (e.g., as a dotted outline or light shading). If the user selects a metric (e.g., by tapping on the associated correlation button), the application may display that metric for correlation analysis.

Figure 34:
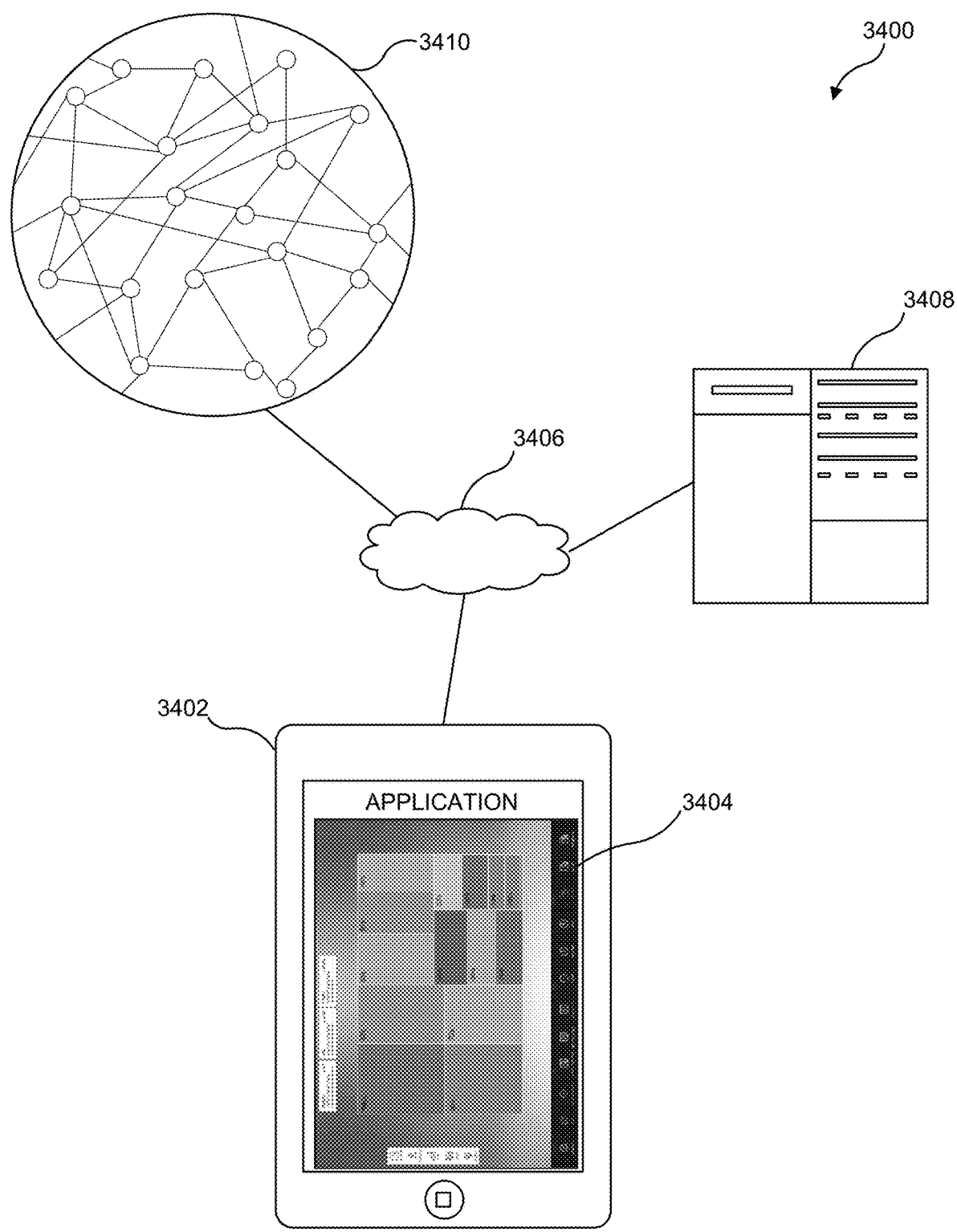
FIG. 34 is a block diagram of an example of a network computing environment.

Referring now to FIG. 34, a block diagram is shown of an example of a network computing environment 3400 on which some implementations may operate. In this example, a computing device 3402 is operated by a user of an application 3404 that facilitates discovery and exploration of data. The application 3404 may be local to the computing device 3402 or may be hosted by an external server (e.g., for remote access or for download by other computing devices). The application 3404 may access data that is stored internally on the computing device 3402, data that is stored on a removable memory connected to the computing device 3402, and/or data that is stored on a remote server or network. Regardless of the location of the data, the application 3404 may access and process the data as described in FIGS. 1-33 to facilitate the discovery and exploration of data by the user of computing device 3402.

The computing device 3402 may utilize a communication medium, such as network 3406, to access one or more remote servers or networks that store data. In the example of FIG. 34, external server 3408 and remote network 3410 are illustrated. For illustrative purposes, several elements illustrated in FIG. 34 and described below are represented as monolithic entities. However, these elements each may include and/or be implemented on numerous interconnected computing devices and other components that are designed to perform a set of specified operations.

The external server 3408 may, in addition or as an alternative to storing data accessible by the application 3404, host an independent application that uses other data to provide a service to one or more client devices (e.g., the computing device 3402). As such, the server 3408 may be configured to extract and store data from other sources of data (e.g., the external network 3410) for use by the application 3402.

The network 3406 may provide direct or indirect communication links between the computing device 3402, the external server 3408, and the external network 3410. Examples of the network 3406 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

The computing device 3402 may be any of a number of different types of computing devices including, for example, a tablet computer, or a mobile phone, a smartphone, a personal digital assistant, a laptop or netbook computer, or a desktop computer. Furthermore, the computing device 3402 may have internal or external storage components for storing data and programs such as an operating system and one or more application programs. In particular, the internal or external storage components for the computing device 3402 may store a client application for interfacing with the external server 3408 or external network 3410. Additionally or alternatively, the computing device 3402 may be configured to interface with the external server 3408 or the external network 3410 without a specific client application, using, for example, a web browser.

As such, one or more user identities may be able to use the computing device 3402 to access and explore data. Similarly, one or more users of the independent application that may be hosted by the external server 3408 may be able to use the computing device 3402 to access the independent application.

The computing device 3402 also typically may include a central processing unit (CPU) for executing instructions stored in storage and/or received from one or more other electronic devices, for example over the network 3406. The computing device 3402 also usually may include one or more communication devices for sending and receiving data. One example of such communications devices is a modem. Other examples include antennas, transceivers, communications cards, and other network adapters capable of transmitting and receiving data over a network (e.g., the network 3406) through a wired or wireless data pathway.

The application 3404 (or an external server, such as server 3408) may extract data from relevant sources. After extracting the data, the application 3404 (or the external server 3408) may store the extracted data (e.g., in the storage components in the computing device 3402 or in the server 3408). For example, in some implementations, the application 3404 may be hosted by the computing system 3408, which may store the extracted data in one or more databases. As described in FIGS. 1-33, the application 3404 may process the extracted data based on a user's interactions with visualizations of the data displayed by the application 3404. In some implementations, the application 3404 may process the extracted data stored either locally in the computing device 3402 or in an external server.

The application 3404 occasionally may repeat the data extraction, for example, to keep the data that is available to the application 3404 generally synchronized with the source of the data, or for any other suitable purpose, such as for reducing access delay or other reasons. The external network 3410 may be a physical network of interconnected computers, or may be a virtual network (e.g., a social networking platform) that is hosted on one or more computing devices.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a pointing device (e.g., a mouse or a trackball), or a touch-screen interface by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A method performed by one or more computers, the method comprising:
providing, by the one or more computers, visualization data for a visualization of a data set, wherein the visualization comprises a graph or chart having elements representing different portions of the data set divided according to values of a first attribute or metric;
receiving, by the one or more computers, data indicating user input that selects (i) a first element, from among the elements of the chart or graph, that indicates a measure of a first portion of the data set for which a value for the first attribute or metric is in a first set or range of values and (ii) a second element, from among the elements of the chart or graph, that indicates a measure of a second portion of the data set for which a value for the first attribute or metric is in a second range or set of values;
after receiving the user input that selects the first element that corresponds to the first portion of the data set and the second element that corresponds to the second portion of the data set, receiving, by the one or more computers, data indicating a selection by a user of a second attribute or metric indicated by the data set; and
in response to receiving the data indicating the selection of the second attribute or metric, providing, by the one or more computers, visualization data for (i) a first chart or graph of the first portion of the data set, wherein the first chart or graph subdivides the first portion of the data set according to values for the second attribute or metric and (ii) a second chart or graph of the second portion of the data set, wherein the second chart or graph subdivides the second portion of the data set according to values for the second attribute or metric.

2. The method of claim 1, wherein the different elements representing portions of the data set represent aggregations of data corresponding to different ranges of values for the first attribute or metric.

3. The method of claim 1, further comprising:
in response to receiving the data indicating the selection of the second attribute or metric:
causing the graph or chart having the elements representing the different portions of the data set to be removed from display in a user interface; and
causing the first chart or graph and the second chart or graph to be displayed in the user interface.

4. The method of claim 3, comprising:
after (i) causing the visualization to be removed from display and (ii) causing the first chart or graph and the second chart or graph to be displayed in the user interface, receiving a user input that deselects the second attribute or metric;
in response to receiving the user input that deselects the second attribute or metric:
causing the first chart or graph and the second chart or graph to be removed from display in the user interface; and
causing the graph or chart having the elements representing the different portions of the data set to be displayed in the user interface.

5. The method of claim 1, further comprising updating the visualization to integrate the first chart or graph and the second chart or graph into a presentation of the visualization.

6. The method of claim 1, wherein receiving the data indicating the user input that selects the first element and the second element comprises receiving data indicating user interactions with a touchscreen display presenting the visualization, the user interactions occurring at regions of the touchscreen display where the first element and the second element are presented in the chart or graph having the elements representing the different portions of the data set according to values of the first attribute or metric.

7. The method of claim 1, further comprising causing presentation of the visualization with multiple user interface elements that each correspond to a different attribute or metric indicated by the data set;
wherein receiving data indicating a selection of the second attribute or metric indicated by the data set comprises receiving data indicating a user interaction with a particular user interface element of the multiple user interface elements that each correspond to a different attribute or metric indicated by the data set.

8. The method of claim 7, wherein the visualization data for the first chart or graph and the second chart or graph is provided in response to determining that the user interaction includes dragging one of the multiple user interface elements to a display area in which the visualization is presented.

9. The method of claim 1, wherein receiving the data indicating a selection of the second attribute or metric indicated by the data set comprises receiving data indicating a user interaction with a user interface element corresponding to the second attribute or metric; and
wherein the method further comprises:
while the user interaction with the user interface element is maintained, causing the first chart or graph and the second chart or graph to be presented;
determining that the user interaction with the user interface element has ended; and in response to determining that the user interaction with the user interface element has ended, causing the first chart or graph and the second chart or graph to be presented.

10. The method of claim 1, wherein the first chart or graph and the second chart or graph are a same type of chart or graph as the graph or chart having the elements representing the different portions of the data set according to values of the first attribute or metric.

11. The method of claim 1, wherein the first chart or graph and the second chart or graph are a different type of chart or graph than the graph or chart having the elements representing the different portions of the data set according to values of the first attribute or metric.

12. The method of claim 1, wherein the data set is a data set in a database system.

13. The method of claim 1, wherein providing the visualization data for the first chart or graph and the second chart or graph causes the first chart or graph and the second chart or graph to be presented concurrently on a user interface.

14. A system comprising:
one or more computers; and
one or more computer-readable media storing instructions that, when executed by the one or more computers, cause the one or more computers to perform operations comprising:
providing, by the one or more computers, visualization data for a visualization of a data set, wherein the visualization comprises a graph or chart having elements representing different portions of the data set organized according to values of a first attribute or metric;
receiving, by the one or more computers, data indicating user input that selects (i) a first element, from among the elements of the chart or graph, that indicates a measure of a first portion of the data set for which a value for the first attribute or metric is in a first set or range of values and (ii) a second element, from among the elements of the chart or graph, that indicates a measure of a second portion of the data set for which a value for the first attribute or metric is in a second range or set of values;
after receiving the user input that selects the first element that corresponds to the first portion of the data set and the second element that corresponds to the second portion of the data set, receiving, by the one or more computers, data indicating a selection by a user of a second attribute or metric indicated by the data set; and
in response to receiving the data indicating the selection of the second attribute or metric, providing, by the one or more computers, visualization data for (i) a first chart or graph of the first portion of the data set, wherein the first chart or graph subdivides the first portion of the data set according to values for the second attribute or metric and (ii) a second chart or graph of the second portion of the data set, wherein the second chart or graph subdivides the second portion of the data set according to values for the second attribute or metric.

15. The system of claim 14, wherein the different elements representing portions of the data set represent aggregations of data corresponding to different ranges of values for the first attribute or metric.

16. The system of claim 14, wherein the operations further comprise:
in response to receiving the data indicating the selection of the second attribute or metric:
causing the graph or chart having the elements representing the different portions of the data set to be removed from display in a user interface; and
causing the first chart or graph and the second chart or graph to be displayed in the user interface.

17. The system of claim 16, wherein the operations further comprise:
after (i) causing the visualization to be removed from display and (ii) causing the first chart or graph and the second chart or graph to be displayed in the user interface, receiving a user input that deselects the second attribute or metric;
in response to receiving the user input that deselects the second attribute or metric:
causing the first chart or graph and the second chart or graph to be removed from display in the user interface; and
causing the graph or chart having the elements representing the different portions of the data set to be displayed in the user interface.

18. The system of claim 14, wherein the operations further comprise updating the visualization to integrate the first chart or graph and the second chart or graph into a presentation of the visualization.

19. One or more non-transitory computer-readable media storing instructions that, when executed by one or more computers, cause the one or more computers to perform operations comprising:
providing, by the one or more computers, visualization data for a visualization of a data set, wherein the visualization comprises a graph or chart having elements representing different portions of the data set organized according to values of a first attribute or metric;
receiving, by the one or more computers, data indicating user input that selects (i) a first element, from among the elements of the chart or graph, that indicates a measure of a first portion of the data set for which a value for the first attribute or metric is in a first set or range of values and (ii) a second element, from among the elements of the chart or graph, that indicates a measure of a second portion of the data set for which a value for the first attribute or metric is in a second range or set of values;
after receiving the user input that selects the first element that corresponds to the first portion of the data set and the second element that corresponds to the second portion of the data set, receiving, by the one or more computers, data indicating a selection by a user of a second attribute or metric indicated by the data set; and
in response to receiving the data indicating the selection of the second attribute or metric, providing, by the one or more computers, visualization data for (i) a first chart or graph of the first portion of the data set, wherein the first chart or graph subdivides the first portion of the data set according to values for the second attribute or metric and (ii) a second chart or graph of the second portion of the data set, wherein the second chart or graph subdivides the second portion of the data set according to values for the second attribute or metric.

* * * * *